US012056583B2

(12) United States Patent
Zarandioon et al.

(10) Patent No.: US 12,056,583 B2
(45) Date of Patent: Aug. 6, 2024

(54) TARGET VARIABLE DISTRIBUTION-BASED ACCEPTANCE OF MACHINE LEARNING TEST DATA SETS

(71) Applicant: Amazon Technologies, Inc., Seattle, WA (US)

(72) Inventors: Saman Zarandioon, Seattle, WA (US); Robert Matthias Steele, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1013 days.

(21) Appl. No.: 16/938,998

(22) Filed: Jul. 26, 2020

(65) Prior Publication Data

US 2020/0356901 A1 Nov. 12, 2020

Related U.S. Application Data

(63) Continuation of application No. 15/225,545, filed on Aug. 1, 2016, now Pat. No. 10,726,356.

(51) Int. Cl.
*G06N 20/00* (2019.01)
*G06N 7/01* (2023.01)

(52) U.S. Cl.
CPC ............. *G06N 20/00* (2019.01); *G06N 7/01* (2023.01)

(58) Field of Classification Search
CPC ................................. G06N 20/00; G06N 7/01
See application file for complete search history.

(56) References Cited

U.S. PATENT DOCUMENTS

| | | |
|---|---|---|
| 4,821,333 A | 4/1989 | Gillies |
| 5,121,338 A | 6/1992 | Lodder |
| 7,743,003 B1 | 6/2010 | Tong et al. |
| 8,078,556 B2 | 12/2011 | Adi et al. |
| 8,229,864 B1 | 7/2012 | Lin et al. |
| 8,370,280 B1 | 2/2013 | Lin et al. |
| 8,429,103 B1 | 4/2013 | Aradhye et al. |
| 8,606,730 B1 | 12/2013 | Tong et al. |
| 8,682,814 B2 | 3/2014 | DiCorpo et al. |
| 9,294,236 B1* | 3/2016 | Ward, Jr. ........... G06Q 30/0645 |
| 9,336,494 B1 | 5/2016 | Purpura et al. |
| 10,726,356 B1 | 7/2020 | Zarandioon et al. |
| 2002/0169652 A1* | 11/2002 | Busche ................. G06Q 30/02 706/21 |

(Continued)

FOREIGN PATENT DOCUMENTS

WO 2012151198 11/2012

OTHER PUBLICATIONS

Feldman, Ronen, Ido Dagan, and Haym Hirsh. "Mining text using keyword distributions." Journal of Intelligent Information Systems 10 (1998): 281-300. (Year: 1998).*

(Continued)

*Primary Examiner* — Casey R. Garner
(74) *Attorney, Agent, or Firm* — Robert C. Kowert; Kowert, Hood, Munyon, Rankin & Goetzel, P.C.

(57) ABSTRACT

Respective statistical distributions of a target variable within a proposed training data set and a proposed test data set for a machine learning model are obtained. A metric indicative of the difference between the two statistical distributions is computed. The difference metric is used to determine whether the proposed test data set is acceptable to evaluate the machine learning model.

20 Claims, 13 Drawing Sheets

(56) References Cited

U.S. PATENT DOCUMENTS

| | | | |
|---|---|---|---|
| 2005/0105712 | A1 | 5/2005 | Williams et al. |
| 2006/0179016 | A1 | 8/2006 | Forman et al. |
| 2008/0215513 | A1 | 9/2008 | Weston et al. |
| 2011/0185230 | A1 | 7/2011 | Agrawal et al. |
| 2011/0313953 | A1 | 12/2011 | Lane et al. |
| 2012/0054658 | A1 | 3/2012 | Chuat et al. |
| 2012/0253927 | A1 | 10/2012 | Qin et al. |
| 2014/0046879 | A1* | 2/2014 | Maclennan .......... G06Q 10/067 706/12 |
| 2015/0379430 | A1* | 12/2015 | Dirac .................... G06N 20/00 706/12 |

OTHER PUBLICATIONS

U.S. Appl. No. 14/950,953, filed Nov. 24, 2015, Tianming Zheng, et al.
International Search Report and Written Opinion from PCT/US2015/038610, Date of mailing Sep. 25, 2015, Amazon Technologies, Inc., pp. 1-12.
Kolo, B., "Binary and Multiclass Classification, Passage", Binary and Multiclass Classification, XP002744526, Aug. 12, 2010, pp. 78-80.
Gamma, E., et al., "Design Patterns, Passage", XP002286644, Jan. 1, 1995, pp. 293-294; 297, 300-301.
International Search Report and Written Opinion from PCT/US2015/038589, Date of mailing Sep. 23, 2015, Amazon Technologies, Inc., pp. 1-12.
"API Reference", Google Prediction API, Jun. 12, 2013, 1 Page.
"Google Prediction API", Google developers, Jun. 9, 2014, 1 Page.
"Amazon Machine Learning API Reference", Amazon Web Services, Dec. 12, 2012, pp. 1-124.
"Amazon Machine Learning Developer Guide", Amazon Web Services, Aug. 27, 2015, pp. 1-128.
"7.3. Comparisons based on data from two processes", Retrieved from URL: http://www.itl.nist.gov/div898/handbook/prc/section3/prc3.htm on May 31, 2016, pp. 1-2.
"7.3.1. Do two processes have the same mean?", Retrieved from URL: ttp://www.itl.nist.gov/div898/handbook/prc/section3/prc31.htm on May 31, 2016, pp. 1-5.
"Chi Square Two Sample", Nation Institute of Standards and Technology, Retrieved from URL: http://www.itl.nist.gov/div898/software/dataplot/refman1/auxillar/chi2samp.htm on May 31, 2016, pp. 1-6.
Chandra Chekuri, "CS 598CSC: Algorithms for Big Data", Lecture date: Sep. 25, 2014, pp. 1-6.
Michael Greenwald, et al., "Space-Efficient Online Computation of Quantile Summaries", ACM SIGMOD 2001, May 21-24, 2001, pp. 58-66.
"Visual Information Theory—colah's blog", Oct. 14, 2015, Downloaded May 31, 2016, pp. 1-48.
Tsai, D., "A quantile-quantile plot based pattern matching for defect detection", 2005, Pattern Recognition Letters, vol. 26, Issue 13, Oct. 2005, pp. 1948-1962 (Year 2005).
Chawla, N. V., "SMOTE: Synthetic Minority Over-sampling Technique", 2002, Journal of Artificial Intelligence Research, Jan. 2002 (Year 2002).
Feldman, R., et al., "Mining Text Using Keyword Distributions", 1998, Journal of Intelligent Information Systems 10, pp. 281-300 (Year 1998).
Kohavi, R., "A Study of Cross-Validation and Bootstrap for Accuracy Estimation and Model Selection", 1995, International Joint Conferenceon Artificail Intelligence (IJCAI) (Year 1995).
Le, S. Q., et al., "An association-based dissimilarity measure for categorical data", 2005, Pattern Recognition Letters, 26, 2549-2557 (Year 2005).
Kifer, D., et al., "Detecting Change in Data Streams", 2004, Proceedings of the 30th VLDB Conference, Toronto, Canada, 2004, pp. 180-191 (Year 2004).

* cited by examiner

TARGET VARIABLE DISTRIBUTION-BASED ACCEPTANCE OF MACHINE LEARNING TEST DATA SETS

This application is a continuation of the U.S. patent application Ser. No. 15/225,545, filed Aug. 1, 2016, which is hereby incorporated by reference herein in its entirety.

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Traditionally, expertise in statistics and in artificial intelligence has been a prerequisite for developing and using machine learning models. For many business analysts and even for highly qualified subject matter experts, the difficulty of acquiring such expertise is sometimes too high a barrier to be able to take full advantage of the large amounts of data potentially available to make improved business predictions and decisions. Furthermore, many machine learning techniques can be computationally intensive, and in at least some cases it can be hard to predict exactly how much computing power may be required for various phases of the techniques. Given such unpredictability, it may not always be advisable or viable for business organizations to build out their own machine learning computational facilities.

The quality of the results obtained from machine learning algorithms may depend on how well the empirical data used for training the models captures key relationships among different variables represented in the data, and on how effectively and efficiently these relationships can be identified. Depending on the nature of the problem that is to be solved using machine learning, very large data sets may have to be analyzed in order to be able to make accurate predictions. As part of the typical workflow for developing and using predictive machine learning models, a data set may be split into a training subset and a test subset. A model may be trained to predict the values of a target or output variable using the values of corresponding input variables of the training subset, while the test subset may be used to evaluate the quality of the predictions made for "new" observation records which were not used for training the model. If the values of the target variables happen to be distributed differently in the test subset than they are in the training subset, the evaluation of the model may make the quality of the model appear to be worse than it should. This in turn may lead to more resources being consumed in attempts to re-train and re-test the model to achieve higher quality, which may in some cases substantially increase the overall cost of generating models for use in production mode.

Figure 1:
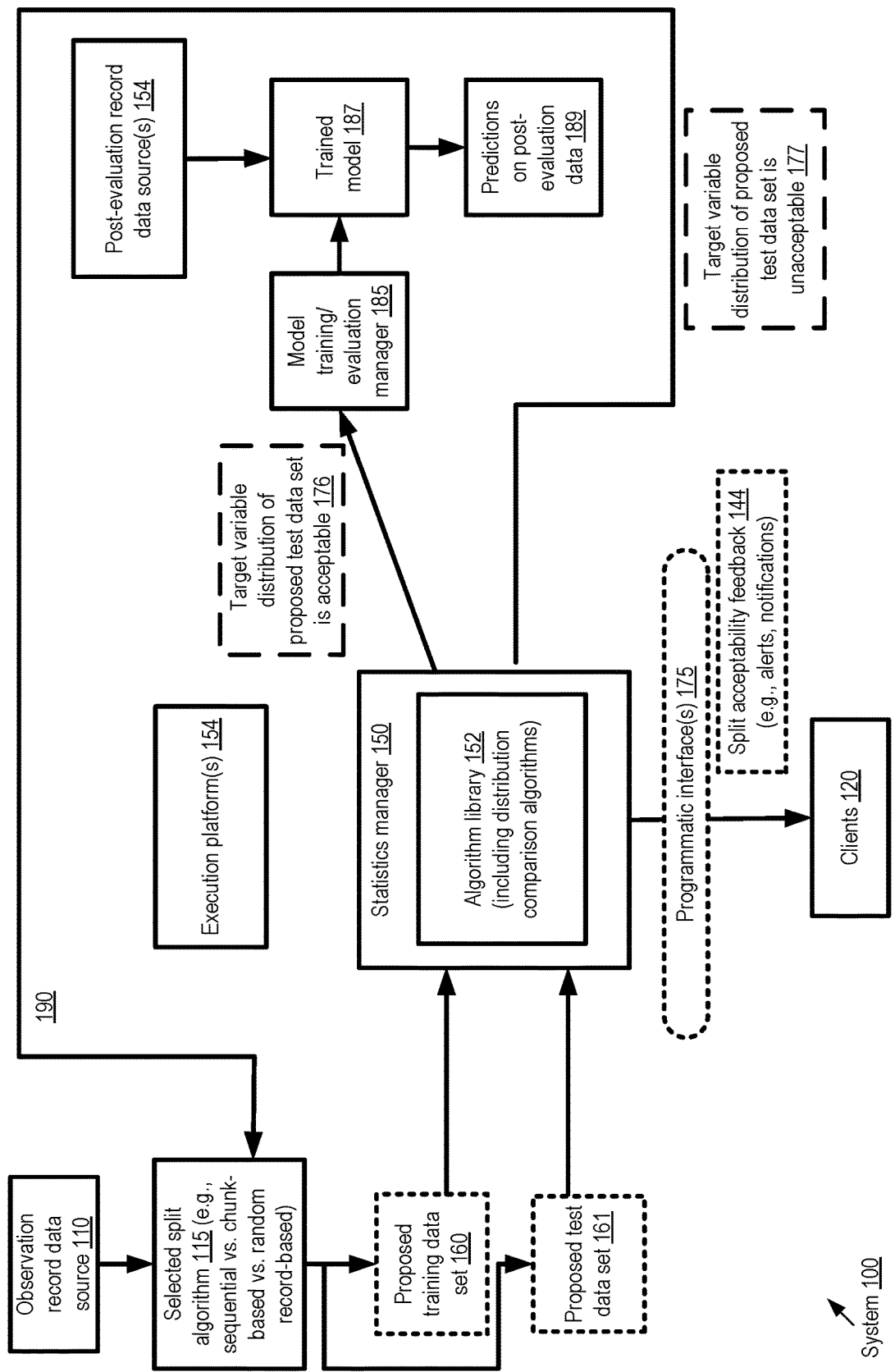
FIG. 1 illustrates an example system environment in which the statistical distribution of a target variable may be used to select or approve a test data set for a machine learning model, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for selecting, approving or validating input data sets for machine learning models based at least partly on an analysis of the distribution of a target variable are described. In some embodiments, such techniques may be employed using the resources of a network-accessible machine learning service (MLS) designed to support large numbers of users and a wide variety of algorithms. In at least some embodiments, the MLS may be implemented at a provider network that comprises numerous data centers with hundreds of thousands of computing and storage devices distributed among numerous data centers, allowing machine learning problems with terabyte-scale or petabyte-scale data sets and correspondingly large compute requirements to be addressed in a relatively transparent fashion while still ensuring high levels of isolation and security for sensitive data. In one embodiment, a number of MLS programmatic interfaces (such as application programming interfaces (APIs)) may be defined by the service, including interfaces which can be used by service clients to request a validation of test and training data sets for various types of machine learning models which are to be developed.

In an important class of machine learning algorithms, called supervised machine learning algorithms, the values of one or more output or target variables are known for respective observation records of an input data set which is to be used to train a given model. The model may be trained, using a subset of the input data set referred to as the training data set (or simply the training set), to predict values of the target variable based on some combination of the remaining input variables. The quality of the predictions of the trained model (on previously unseen data) may be evaluated using a different subset of the input data set, called a test data set (or test set), which is distinct from the training data set and was thus not used for training the model. If the test data happens to differ significantly from the training data set in the statistical distribution of the target variable, the techniques used to evaluate the model may sometimes erroneously indicate that the model has a poorer quality than would have been indicated if the distributions of the target variables in the test and training data sets were more similar to each other. It may also be the case that the distribution differences may cause the model to appear to have a better quality than if the test data set and training data set had more similar distributions of the target variable; however, this scenario may typically be less likely than the scenario in which the model quality appears to be worse than it should appear.

If the evaluation indicates that a model's quality is inadequate (e.g., based on any of various metrics of prediction accuracy), additional resources may often be deployed in an attempt to alleviate quality concerns—e.g., the model may be retrained using a different set of initial parameters or hyper-parameters, a new training data set and test data set may be selected, and so on. Re-training and re-evaluating models with large input data sets (e.g., with tens of millions of observation records in the training data or the test data) may consume a substantial amount of resources. Thus, large differences between the test and training sets with respect to the distribution of the target variable values may sometimes lead to wastage of resources. An algorithm which attempts to avoid such unnecessary resource usage, especially for training/evaluating models with large input data set, by efficiently comparing the statistical distributions of target variables before the training of the model is begun may therefore be employed in various embodiments. If the distribution of the target variable in a proposed test data set does not meet an acceptance criterion, any of various responsive actions may be taken in different embodiments—e.g., the client on whose behalf the model is to be trained may be notified regarding the distribution differences between the test and training data sets, a different algorithm for splitting the input data set into test and training subsets may be recommended, and so on.

According to at least some embodiments, one or more components of the MLS may identify a proposed training data set and a proposed test data set with respect to a given machine learning model which is to be trained and evaluated. Based on any of several factors (such as the type of model to be developed, whether the target variable is categorical or not, the number of records in the training and test data sets, etc.), a determination may be made that the proposed test data set meets a triggering criterion for the invocation of a particular target variable distribution comparison algorithm. Based on an examination of at least a portion of the proposed training data set, an indication of a statistical distribution of the target variable within the proposed training data set may be obtained. Similarly, based on examining at least a portion of the proposed test data set, an indication of the statistical distribution of the target variable within the proposed test data set may be obtained. A metric which represents a difference between the two distributions may then be computed or estimated. The metric may then be used to determine whether the test data set meets an acceptance criterion for evaluating the machine learning model (where the evaluation would be conducted after the model is trained using the proposed training data set). If the difference between the distributions is small enough to designate the test data set as acceptable, the model may be trained (using the proposed training data set) and evaluated (using the proposed test data set) and an indication of the model's prediction quality may be provided to the client. If the difference between the two distributions is too high for acceptance, for example, an indication may be provided to a client regarding the unsuitability of the test data set, or any of several other responsive actions may be taken as discussed below.

The specific techniques used to obtain and/or compare the distributions may vary with the kind of model being developed, the data type of the target variable, etc., in different embodiments. For example, in some cases, the target variable may comprise a categorical variable (which takes a given discrete value from a set of possible discrete values), and a model such as a logistic regression model may be trained. In such a scenario, respective histograms whose individual buckets represent one or more of the category values of the target variable may be generated to represent the distributions of the target variable in the training and test data sets in one embodiment. A variant of a Kullback-Leibler (K-L) divergence metric may be computed from the histograms in some implementations. If a linear regression model is being trained to predict a non-categorical target variable, in some embodiments approximate quantile summaries representing the target variable distributions may be generated, and a variant of a Kolmogorov-Smirnov statistic may be used as the difference metric.

In at least some embodiments, a graphical representation of the distributions of the target variable in the test and training data may be provided to a client, e.g., using a web-based programmatic interface or a standalone graphical user interface (GUI). In other embodiments, a text-based indication of the differences may be provided, instead of or in addition to the graphical representation.

Any of several split algorithms (e.g., sequential splitting, chunk-level splitting, or record-level splitting, each of which is discussed below) may have been used to divide the input data set into the proposed training data set and the proposed test data set in different embodiments. If the proposed test data set does not meet the distribution-based acceptance criterion, in some embodiments the MLS may recommend an alternate split algorithm to the client.

In at least one embodiment, a client may submit a request, via a programmatic interface, that the MLS itself split an input data set into training and test subsets. That is, the MLS may be responsible for assigning individual observation records of the input data to the training subset and the test subset. In some embodiments, the MLS may select a first split algorithm (e.g., based on factors such as initial resource constraints, time constraints, budget constraints, data set size, etc.), subdivide the data set, and then use a target variable distribution comparison algorithm to validate that the test set meets acceptance criteria before providing an indication of the split result to the client. If the initial split results in an unacceptable test data set, in various embodiments a different split algorithm may be tried, and/or one or more parameters may be changed for the original split algorithm, and additional iterations of subdividing the input data may be performed, e.g., until an acceptable test/training split is identified or the available resources are exhausted.

In some embodiments, the MLS may insert one or more synthetic observation records into a proposed test data set to help make the test data set meet an acceptance criterion based on similarity of target variable distribution with the training data. In one embodiment, after a particular machine learning model has been trained and evaluated using a given training data set and a corresponding test data set, the model may be deployed for use in a production environment in which predictions are made for observation records which were neither in the original training data set nor the original test data set. Of course, at the time that the predictions are made in the production environment, in at least some cases the values of the target variables may not be known. In some scenarios, however, the values of the target variables may become available later (e.g., if the target variable is a categorical variable indicating whether a patient is going to show symptoms of a disease within X days, data indicating the presence/absence of the disease symptoms may eventually become available). If the quality of the predictions made for such post-evaluation observations is found to be inadequate, the distributions of the target variable in the post-evaluation observations and the original training data (or the original test data) may be compared. If the difference between these two distributions exceeds a threshold, the model may be retrained and re-evaluated, e.g., using a new training set and a new test set (whose target variable distributions are more similar to those of the post-evaluation observations than the original training set). In at least one embodiment, the statistical distributions of one or more non-target variables (e.g., one or more input variables whose values may be used in the model to predict target variable values) may also be obtained for a proposed training data set and a proposed test data set. Such non-target variable distributions may also be compared and/or indicated via programmatic interfaces to clients in such embodiments.

Example System Environment

FIG. 1 illustrates an example system environment in which the statistical distribution of a target variable may be used to select or approve a test data set for a machine learning model, according to at least some embodiments. As shown, system 100 may comprise a statistics manager 150 configured to compute or obtain various statistical measures associated with data sets to be used for machine learning. In some embodiments as discussed below in the context of FIG. 3, the statistics manager may be part of a network-accessible machine learning service; in other embodiments, the statistics manager may be implemented as a standalone tool which is not necessarily associated with or affiliated with a network-accessible service. A data set comprising a plurality of observation records from a data source 110 may be split into a proposed training data set 160 and a proposed test data set 161 in the depicted embodiment, e.g., using a selected split algorithm 115 (such as a sequential split algorithm, a chunk-level split algorithm, or a record-level split algorithm). Individual ones of the observation record may comprise respective values of one or more input variables, as well as a target or output variable whose values are to be predicted by a machine learning model based on the values of the input variables. In some embodiments as discussed below, the input data set may comprise one or more storage objects such as files or database tables, and the statistics manager 150 may be provided the names/locations of the storage objects (and/or the offsets within the storage objects) at which the records of the proposed training and test data sets can be found. Additional metadata, such as the total number of observation records in the proposed training and test data sets, the record delimiters, the type of model which is to be trained, etc., may also be provided to the statistics manager in some embodiments. One of the responsibilities of the statistics manager 150 in system 100 may comprise verifying that at least some statistical properties of the test data set are sufficiently similar to the corresponding statistical properties of the training data set to allow post-training evaluation of the model, using the test data set, to be effective.

Having identified the proposed training data set and the proposed test data set, the statistics manager 150 may make a determination that a comparison of the distributions of the target variable in the test data set and the training data set may be required to approve the proposed training/test split. A particular distribution comparison algorithm may be selected from algorithm library 152, e.g., based on the size of the test and training data sets, the kind of machine learning model to be trained and so on. The distribution comparison algorithm may, for example, indicate the kinds of data structures or statistical objects (e.g., histograms, cumulative distribution functions, and the like) and metrics which are to be used for obtaining and comparing the distributions. At least a subset of the proposed training data set 160 may be examined, e.g., using one or more execution platforms 154, to obtain the statistical distribution of the target variable in the training data set. Similarly, at least a portion of the proposed test data set 161 may be examined using one or more execution platforms to obtain the test set distribution. In at least some embodiments, the analysis of the training and test data sets may be performed at least in part in parallel, using respective sets of execution platforms 154. In one embodiment, multiple execution platforms 154 may be deployed to examine and obtain the statistics for a given data set—e.g., depending on the size of the proposed test data set, N different execution platforms may be used concurrently to obtain distribution information for the target variable within the test data set.

A metric indicative of the difference between the two distributions may then be computed or estimated in the depicted embodiment. The metric may be compared with a threshold value to determine whether the proposed test data set 161 meets an acceptance criterion with respect to the proposed training data set 160. In some embodiments, the particular metric and/or the threshold criterion for acceptability may be selected based on heuristics and/or knowledge base entries accessible to the statistics manager 150.

The statistics manager 150 may implement a variety of programmatic interfaces 175 in the depicted embodiment for interactions with clients 120. The programmatic interfaces may include, for example, a web-based console, application programming interfaces (APIs), command-line tools, graphical user interfaces and the like.

If the proposed test data set is found to be acceptable (block 176 of FIG. 1), an indication of its acceptability may be provided to a model training/evaluation manager 185 in the depicted embodiment, and/or to the client 120 on whose behalf the model is to be trained (e.g., in the form of split acceptability feedback 144, indicating that the proposed split of the data set into test and training subsets is acceptable). A model 187 may be trained using the proposed training data set 160 and evaluated using the proposed test data set 161. A metric of the quality of the predictions made by the trained model on the test data set 161 may be provided in at least some embodiments to the client 120. After the model 187 has been trained and evaluated, it may be deployed in a production mode, in which previously-unseen observation records are obtained from post-evaluation data source(s) 154, and corresponding predictions 189 are generated and provided to clients 120 as desired.

If the proposed test data set is found to be unacceptable (block 177), an indication of the unacceptability may be provided to the client 120 in the depicted embodiment. In some embodiments, a recommendation for a remedial action which may be taken, such as re-splitting the data set using a different split algorithm or a different set of split algorithm parameters, may be provided programmatically to the client as well. In at least some embodiments, the statistics manager may initiate a new split of the data set, as indicated by arrow 190, and repeat the analysis of a new proposed test/training split. In at least one embodiment, a resource budget limit may be imposed on the attempts to find an acceptable test/training split based on target variable distribution analysis. In such an embodiment, if a number of different proposed test and training data sets are identified and none of them are found to meet the acceptance criterion by the time the resource budget is exhausted, the particular split which came closest to being acceptable may be used to train the model.

In some embodiments, at least some combination of the functionality described above with respect to splitting the data sets, obtaining the distribution-related statistics on the data set, training the model, evaluating the model and/or utilizing the model for post-evaluation predictions may be performed by a common set of one or more computing devices. That is, algorithms for splitting the data sets, determining whether the proposed test and training data sets are acceptable using distribution-based comparisons, training the model, evaluating the model and so on need not necessarily be performed at physically or logically distinct components of system 100.

It is noted that the above technique of using target variable distribution comparisons may be applied symmetrically to test data sets and training data sets—e.g., in some embodiments, a proposed training data set may be rejected because the distribution of its target variable values is insufficiently similar to the distribution of the target variable in a proposed test data set. In embodiments in which each observation record of a given input data set is designated as a member of exactly one training/test subset (the test data set or the training data set), the acceptability of the test data set may be equivalent to the acceptability of the training data set, or to the acceptability of the split operation which was used to obtain the test and training data sets. In at least one embodiment, it may sometimes be the case that multiple distinct test data sets may be generated with respect to a given training data set (e.g., out of a million observation records, 600000 may be designated as a training data set, 200000 records may form one proposed test data set, and 200000 records may form a second proposed test data set), in which case the acceptability of a particular test data set may not imply anything about the acceptability of the training data set or the acceptability of a different test data set. In some embodiments, similar statistical distribution comparisons between test and training data sets may be obtained for one or more non-target variables (i.e., not just for the target variables whose values are to be predicted). This may be done, for example, in response to specific requests from clients for comparisons between distributions of specified input variables, or as part of general statistical analyses of proposed test/training splits.

Algorithm Selection Factors

Figure 2:
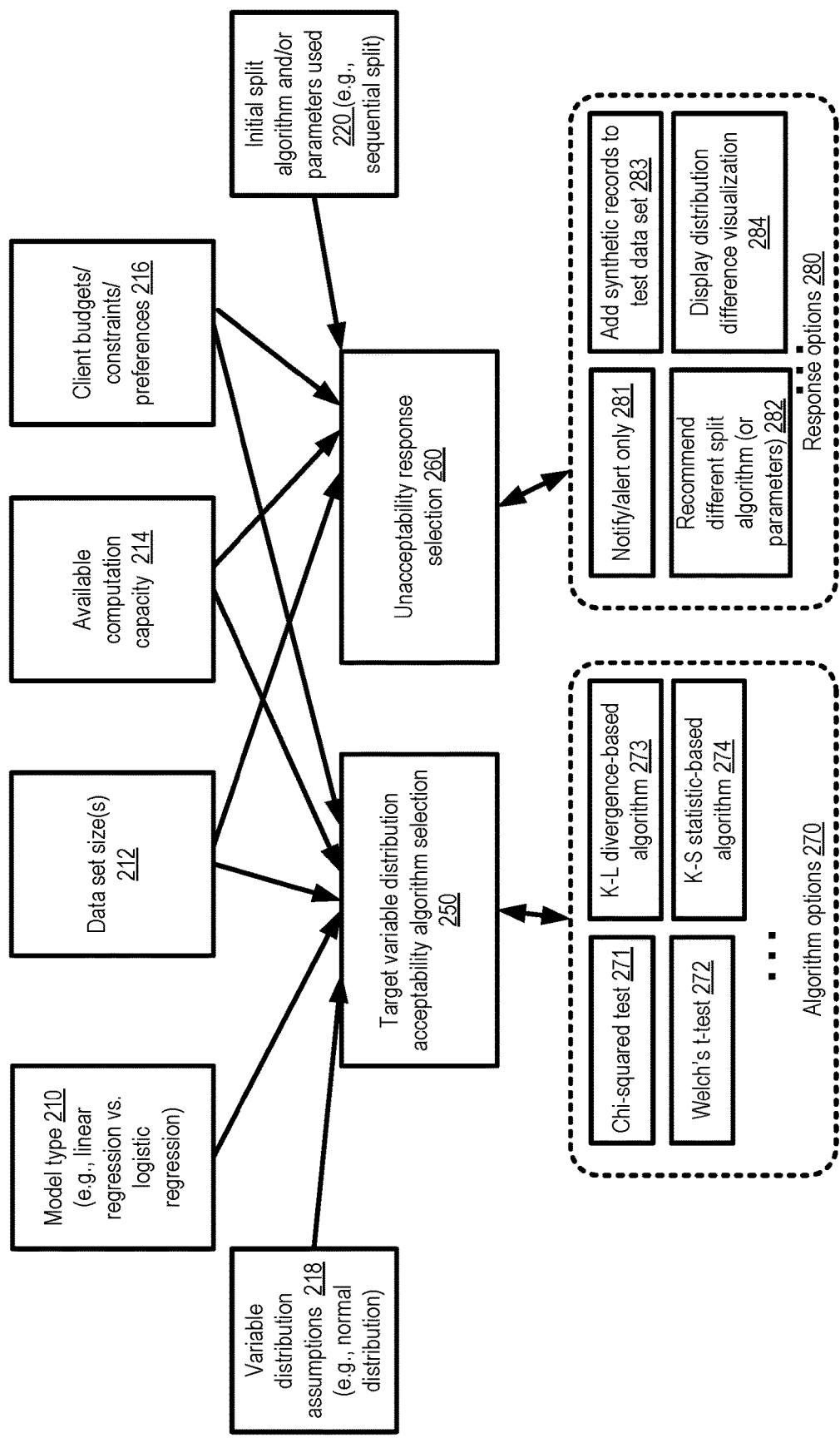
FIG. 2 illustrates examples of factors which may be taken into account to select an algorithm for comparing distributions of target variables, and to respond to a determination that a test data set does not meet an acceptability criterion, according to at least some embodiments.

FIG. 2 illustrates examples of factors which may be taken into account to select an algorithm for comparing distributions of target variables, and to respond to a determination that a test data set does not meet an acceptability criterion, according to at least some embodiments. A number of target variable distribution-based algorithm options 270 may be available in the depicted embodiment, including for example chi-squared tests 271, Welch's t-test 272, one or more Kullback-Leibler (K-L) divergence-based algorithms 273, or one or more algorithms 274 based on the Kolmogorov-Smirnoff (K-S) statistic.

Factors which may be considered when selecting the particular algorithm to be used for a given test/training data set combination may include, among others, the type 210 of model (e.g., linear regression versus logistic regression) which is to be trained/evaluated, the sizes 212 of the data sets, the available computation capacity 214, client budgets, constraints or preferences 216, and/or assumptions 218 regarding the distributions of the target variable in the depicted embodiment. Some algorithms, such as chi-squared tests and/or Welch's t-tests may be more suitable for small data sets, for example, as the p-values used in such tests often tend to be close to zero for very large data sets. Welch's t-test may also rely on an underlying assumption that the target variable is normally distributed, which may not hold for some data sets. The computational and/or memory capacity required may differ from one algorithm to another for the same data set size, and the statistics manager may be able to select particular algorithms (or parameters for the algorithms, such as the number of histogram buckets) based on available resource capacities. In some embodiments, the client may indicate preferred algorithms for test/training data set validation, or resource/budget constraints which may be used to select the algorithm to be used. Some algorithms may be more suitable (or only usable) for certain types of models—e.g., the K-L divergence-based algorithms and the chi-squared tests may be applicable to logistic regression models, while the K-S statistic based algorithms and Welch's t-test may be applicable to linear regression models. Other factors may also play a role in selecting distribution comparison algorithms in some embodiments.

A variety of response options 280 may be available in the event that a proposed test data set is found unacceptable in the depicted embodiment. These options (from among which more than one may be implemented in some scenarios) may include notify/alert only option 281, in which the client is simply informed that the test data set was not determined to be acceptable, and no further action is taken unless the client initiates such action. In some embodiments, one or more synthetic observation records may be added to the test data set (option 283) to make the target variable distribution more similar to that of the training data set. Adding such synthetic records may require pre-approval from the client in at least some embodiments. In various embodiments, a visualization of the differences in the distributions of the target variable in the training and test data sets may be provided (option 284), e.g., via a programmatic interface such as a console or graphical user interface. In some embodiments, a recommendation to re-split the input data into new training/test subsets may be provided (option 282), e.g., using a different split algorithm or using a different set of split algorithm parameters with the same split algorithm.

Some of the factors which influence the algorithm selection 250 may also influence the response selection 260 in the depicted embodiment—e.g., a client's preferences may indicate whether a graphical representation of the distribution differences is to be provided, whether synthetic records should be added to the test data set, etc. The type of split algorithm (or parameters of the split algorithm) 220 used for obtaining the proposed test data set may influence whether a new split is recommended in various embodiments—for example, if a sequential split algorithm was used initially, a recommendation to use a record-level split algorithm may be generated, but if a record-level split was used for the initial split, a recommendation for a sequential split may not be provided as the results of the record-level split may be expected to have superior statistical properties than the results of a sequential split. The size of the data sets and the available computation capacity may also influence the choice of the response 260—e.g., if the data set is very large, further feedback from the client may be requested instead of adding synthetic observation records.

Machine Learning Service

Figure 3:
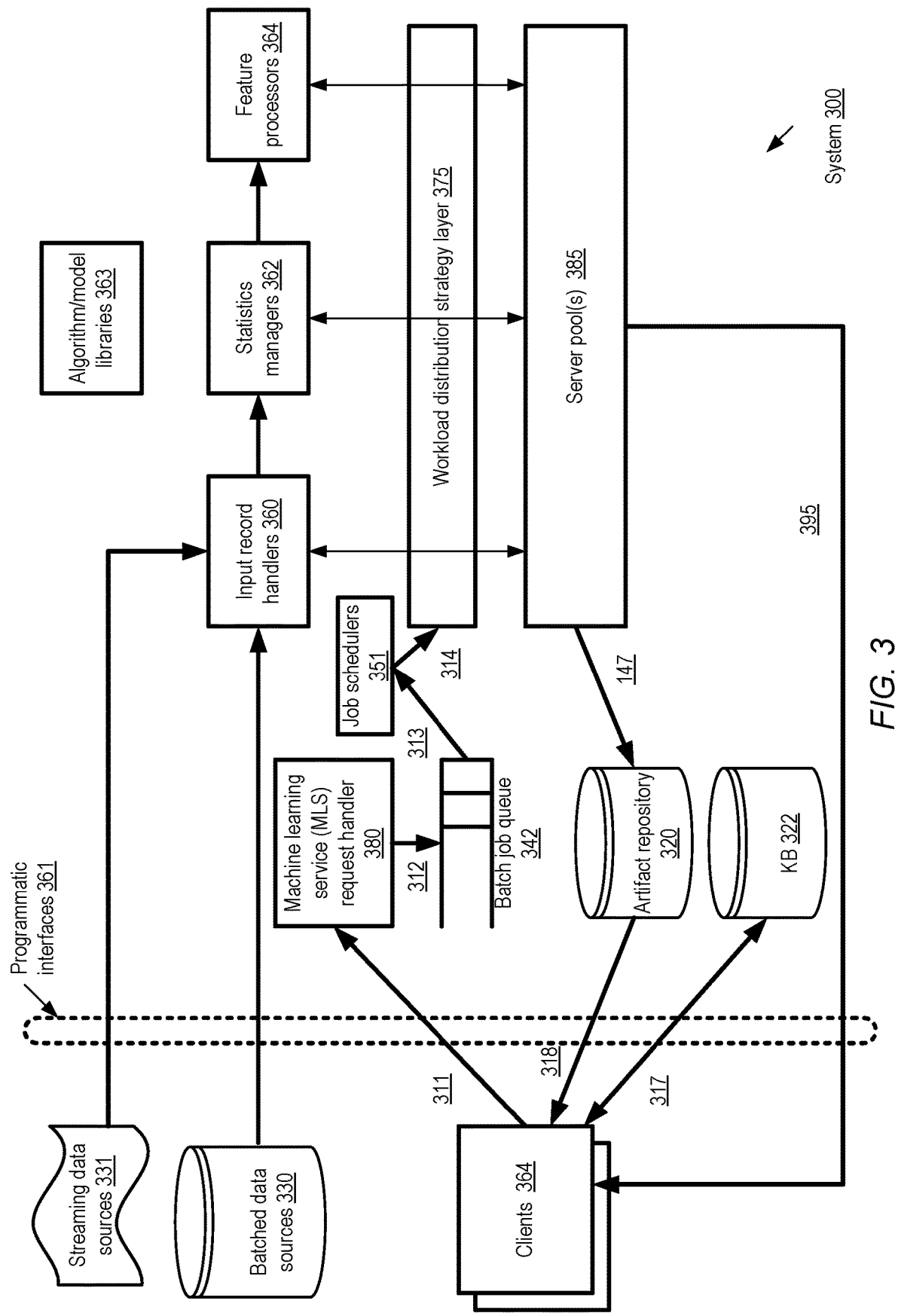
FIG. 3 illustrates an example of a network-accessible machine learning service at which target variable distribution-based analyses of data sets may be performed, according to at least some embodiments.

FIG. 3 illustrates an example of a network-accessible machine learning service at which target variable distribution-based analyses of data sets may be performed, according to at least some embodiments. The distribution-based analysis techniques discussed above may be implemented, for example, by statistics managers 362 of such a service. In system 300, the machine learning service (MLS) may implement a set of programmatic interfaces 361 (e.g., APIs, command-line tools, web pages, or standalone GUIs) that can be used by clients 364 (e.g., hardware or software entities owned by or assigned to customers of the MLS) to submit requests 311 for a variety of machine learning tasks or operations, including operations to validate/verify the acceptability of training/test data. The administrative or control plane portion of the MLS may include MLS request handler 380, which accepts the client requests 311 and inserts corresponding job objects into MLS job queue 342, as indicated by arrow 312. In general, the control plane of the MLS may comprise a plurality of components (including the request handler, workload distribution strategy selectors, one or more job schedulers, metrics collectors, and modules that act as interfaces with other services) which may also be referred to collectively as the MLS manager. The data plane of the MLS may include, for example, at least a subset of the servers of pool(s) 385, storage devices that are used to store input data sets, intermediate results or final results (some of which may be part of the MLS artifact repository), and the network pathways used for transferring client input data and results.

Each job object may indicate one or more operations that are to be performed as a result of the invocation of a programmatic interface 361 (such as interface which can be used to request validation of a test data set), and the scheduling of a given job may in some cases depend upon the successful completion of at least a subset of the operations of an earlier-generated job. In at least some implementations, job queue 342 may be managed as a first-in-first-out (FIFO) queue by one or more job schedulers 351, with the further constraint that the dependency requirements of a given job must have been met in order for that job to be removed from the queue. A job J1 to validate a test data set using target value distribution analysis, for example, may have dependency on a job J2 which comprises splitting an input data set into training and test subsets, and/or a dependency on a job J3 which comprises cleansing/normalizing a raw data set. In some embodiments, jobs created on behalf of several different clients may be placed in a single queue, while in other embodiments multiple queues may be maintained (e.g., one queue in each data center of the provider network being used, or one queue per MLS customer).

Asynchronously with respect to the submission of the requests 311, the next job whose dependency requirements have been met may be removed from job queue 342 in the depicted embodiment by a job scheduler 351, as indicated by arrow 313, and a processing plan comprising a workload distribution strategy may be identified for it. The workload distribution strategy layer 375, which may also be a component of the MLS control plane as mentioned earlier, may determine the manner in which the lower level operations of the job are to be distributed among one or more compute servers (e.g., servers selected from pool 385 as indicated by arrow 314), and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs may be stored as MLS artifacts within repository 320 in some embodiments, as indicated by arrow 347. Such results may, for example, comprise target variable distribution comparisons generated by statistics managers 362 using algorithm/model libraries 363.

In at least one embodiment, some relatively simple types of client requests 311 may result in the immediate generation, retrieval, storage, or modification of corresponding artifacts within MLS artifact repository 320 by the MLS request handler 380. Thus, the insertion of a job object in job queue 342 may not be required for all types of client requests. For example, a creation or removal of an alias for an existing model may not require the creation of a new job in such embodiments. In the embodiment shown in FIG. 3, clients 364 may be able to view at least a subset of the artifacts stored in repository 320, e.g., by issuing read requests 318 via programmatic interfaces 361.

A client request 311 may indicate one or more parameters that may be used by the MLS to perform the operations, such as a data source definition, a feature processing transformation recipe, or parameters to be used for a particular machine learning algorithm. In some embodiments, artifacts respectively representing the parameters may also be stored in repository 320. Some machine learning workflows, which may correspond to a sequence of API requests from a client 364, may include the extraction and cleansing of input data records from streaming data source 331 and/or batched data sources 330 by input record handlers 360 of the MLS. This first portion of the workflow may be initiated in response to a particular API invocation from a client 364, and may be executed using a first set of resources from pool 385. The input record handlers may, for example, perform such tasks as cleansing or normalizing the data records, sampling the data records, and so on, in accordance with a set of functions defined in an I/O (input/output) library of the MLS. The input data may comprise data records that include variables of any of a variety of data types, such as, for example text, a numeric data type (e.g., real or integer), Boolean, a binary data type, a categorical data type, an image processing data type, an audio processing data type, a bioinformatics data type, a structured data type such as a data type compliant with the Unstructured Information Management Architecture (UIMA), and so on.

In at least some embodiments, the input data reaching the MLS may be encrypted or compressed, and the MLS input data handling machinery may have to perform decryption or decompression before the input data records can be used for machine learning tasks. In some embodiments in which encryption is used, MLS clients may have to provide decryption metadata (e.g., keys, passwords, or other credentials) to the MLS to allow the MLS to decrypt data records. Similarly, an indication of the compression technique used may be provided by the clients in some implementations to enable the MLS to decompress the input data records appropriately. The output produced by the input record handlers may be fed to statistics managers 362 in some embodiments, where the kinds of algorithms discussed above for approving/rejecting test data sets vis-á-vis training data sets may be implemented.

In some embodiments, the output of the record handlers 360 and/or the statistics managers 362 may be sent to feature processors 364, where a set of transformation operations may be performed using another set of resources from pool 385. Any of a variety of feature processing approaches or recipes may be used depending on the problem domain: e.g., the recipes typically used for computer vision problems may differ from those used for voice recognition problems, natural language processing, and so on. The output of the feature processing transformations may in turn be used as input for a selected machine learning algorithm from a library 363, which may be executed using yet another set of resources from pool 385. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, statistical analysis, feature processing, or for implementing additional machine learning algorithms than are supported natively by the MLS. In some embodiments, some of the intermediate results (e.g., summarized statistics and/or indications of the acceptability/unacceptability of test data sets produced by the statistics managers 362) of a machine learning workflow may be stored in MLS artifact repository 320. Intermediate and/or final results 395 of the execution of the workflows at servers 385, which may also include the results of the distribution comparison algorithms for test data set analysis, may be provided to clients 364 in various embodiments.

In the embodiment depicted in FIG. 3, the MLS may maintain knowledge base 322 containing information on best practices for various machine learning tasks. Entries may be added into the best practices KB 322 by various control-plane components of the MLS, e.g., based on metrics collected from server pools 385, feedback provided by clients 364, and so on. Clients 364 may be able to search for and retrieve KB entries via programmatic interfaces 361, as indicated by arrow 317, and may use the information contained in the entries to select parameters (such as specific recipes or algorithms to be used) for their request submissions. In at least some embodiments, new APIs may be implemented (or default values for API parameters may be selected) by the MLS on the basis of best practices identified over time for various types of machine learning practices. The knowledge base entries may also be used in some embodiments for selection of algorithms and parameters (such as acceptability criteria) for test data set validation by the statistics managers 362, and/or for identifying the appropriate responses to the detection that a given test data set is unacceptable.

In some embodiments, as mentioned earlier, a machine learning service may be implemented using a plurality of network-accessible services of a provider network, such as a virtualized computing services, one or more storage services, and the like. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. A given provider network may include numerous data centers hosting various resource pools, such as collections of physical and/or virtualized computer servers (including server pools 385), storage devices, networking equipment and the like, needed to implement, configure and distribute the infrastructure and services offered by the provider. At least some provider networks and the corresponding network-accessible services may be referred to as "public clouds" and "public cloud services" respectively. Within large provider networks, some data centers may be located in different cities, states or countries than others, and in some embodiments the resources allocated to a given service such as the MLS may be distributed among several such locations to achieve desired levels of availability, fault-resilience and performance.

Split Algorithm Examples

In some embodiments, a machine learning service may provide an I/O library which includes various types of data filtering algorithms, including, for example, algorithms for sampling (obtaining a subset of a data set), consistently splitting a data set into subsets for training/testing, shuffling (rearranging the order of the input data objects), or partitioning for parallelism (e.g., dividing a data set into N subsets for a computation implemented using a parallel computing infrastructure, or for performing multiple parallel training operations for a model). A number of different algorithms for splitting input data into training data sets and test data sets may be supported in various embodiments, including for example sequential splitting, chunk-level splitting and record-level splitting. For some data sets, the target variable values within observation records that happen to be located near to one another may be somewhat correlated; as a result, the distribution of the target variable values within the test data set relative to the training data set may be influenced by the split algorithm. Among the three types of split algorithms discussed below, for example, the probability of encountering dissimilar distributions of the target variable between a test data set and a training data set may in general be highest for sequential splitting; however, the resource consumption associated with performing the split may be lower for sequential splitting than for the other two approaches in at least some implementations. As such, a tradeoff may have to be considered between the cost of the split and the quality of the test/training data sets resulting from the split with respect to target variable distribution in at least some embodiments.

Figure 4:
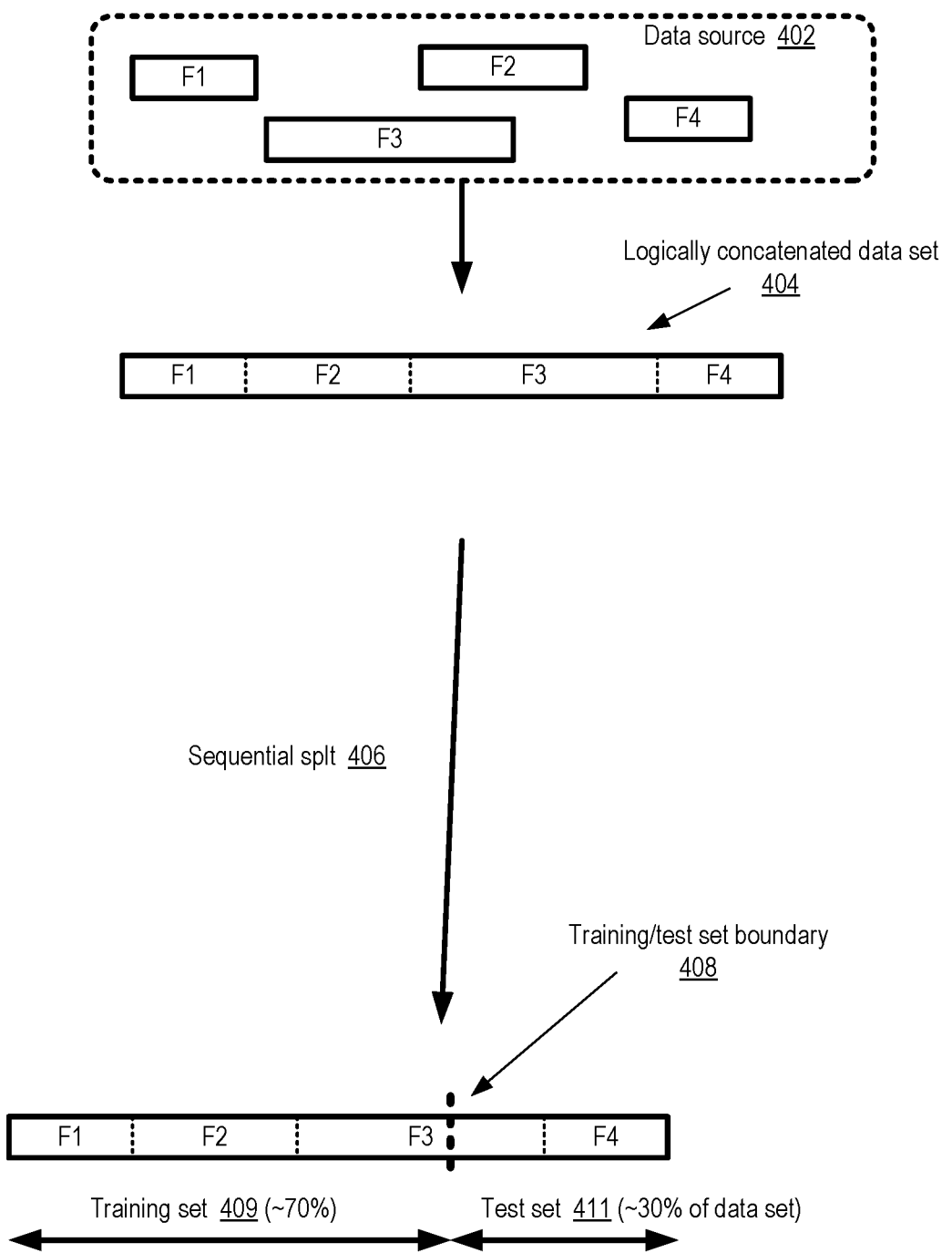
FIG. 4 illustrates an example sequential split algorithm which may be employed to obtain test data sets and training data set, according to at least some embodiments.

FIG. 4 illustrates an example sequential split algorithm which may be employed to obtain test data sets and training data set, according to at least some embodiments. As shown, a data source 402 may comprise a plurality of data objects such as files F1, F2, F3 and F4 in the depicted embodiment. The sizes of the files may differ, and/or the number of observation records in any given file may differ from the number of observation records in other files. A split request submitted by the client may indicate the data source 402, e.g., by referring to locations (e.g., a directory name or a set of URLs) of files F1, F2, F3 and F4. In response to the split request, the MLS may ascertain or estimate the size of the data set as a whole (e.g., the combined size of the files) in the depicted embodiment, and determine an order in which the files should be logically concatenated to form a unified address space. In the example shown, data set 404 may be generated, for example, by logically concatenating the files in the order F1, F2, F3 and F4. In some embodiments, the client's split request may specify the order in which the files of a multi-file data set are to be combined (at least initially), and/or the sizes of the files. In other embodiments, the MLS may determine the concatenation order (e.g., based on any combination of various factors such as lexical ordering of the file names, the sizes of the files, and so on). It is noted that although files are used as an example of the data objects in which observation records are stored in FIG. 4 and some subsequent figures, similar techniques for input filtering may be used regardless of the type of the data objects used (e.g., volumes providing a block-level interface, database records, etc.) in various embodiments.

A training/test data set boundary 408 (e.g., corresponding to a selected observation record delimiter) may be identified within the logically-concatenated data set 404, e.g., based on split parameters indicated by the client. For example, the client may indicate that a 70-30 split is desired, with 70% of the observation records to be included in a proposed training data set 409, and the remaining 30% to be included in a test data set 411. The sequential split algorithm 406 may require the least amount of computational effort (and the lowest cost from a client's perspective) among the available split algorithms in some embodiments, and as a consequence, it may be the default split algorithm selected for client requests in at least some embodiments. However, the problem of location-dependent correlations between target variable values may not be addressed adequately by sequential splitting in at least some scenarios.

Figure 5:
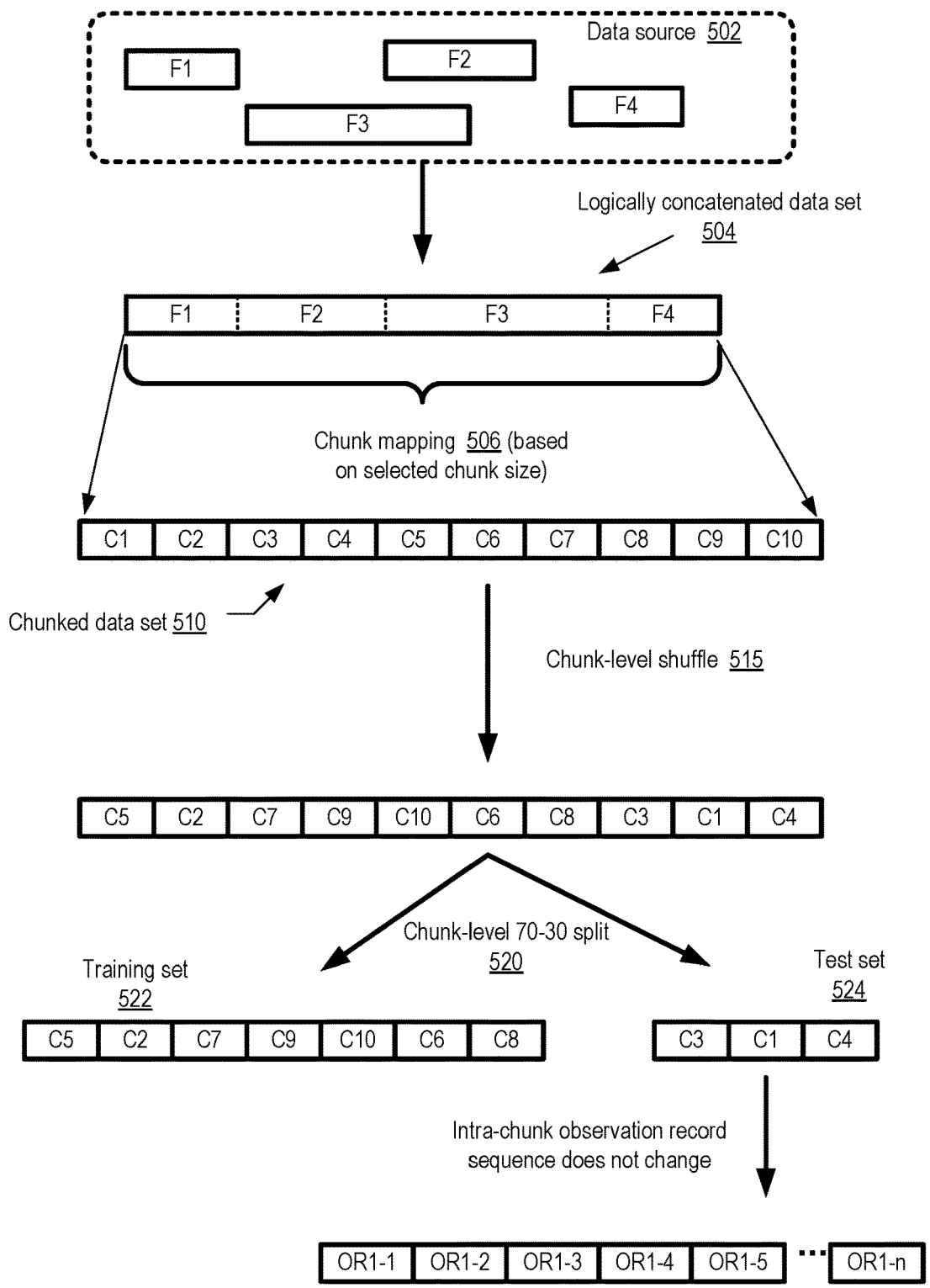
FIG. 5 illustrates an example chunk-level split algorithm which may be employed to obtain test data sets and training data set, according to at least some embodiments.

In some embodiments, large data sets which may, in some cases, not fit within a single server's memory may be subdivided into sub-units called "chunks", with at least some filtering operations such as shuffling, splitting etc. being performed at the chunk boundary level. FIG. 5 illustrates an example chunk-level split algorithm which may be employed to obtain test data sets and training data sets, according to at least some embodiments. As in the case of FIG. 4, a data source 502 may comprise a number of data objects such as files F1, F2, F3 and F4. The data objects may be logically concatenated to form data set 504. The concatenated address space of data set 504 may then be subdivided into a plurality of contiguous chunks, as indicated in chunk mapping 506. In the depicted example, ten chunks C1-C10 may be created. The size of a chunk may be determined based on any of several factors in different embodiments. For example, in one embodiment, the chunk size may be set such that each chunk can fit into the memory of an MLS server (e.g., a server of pools 385 of FIG. 3) at which at least a portion of the response to the client's request is to be generated. Consider a simple scenario in which the memory portions available for the data records at each of several MLS servers is Sm. In such a scenario, a chunk size Cs such that Cs is less than or equal to Sm may be selected. In other embodiments, the client request may indicate a chunk sizing preference, or the MLS may define a default chunk size to be used even if different servers have different amounts of memory available for the data records. In some embodiments, the chunk size to be used for responding to one client request may differ from that used for another request; in other embodiments, the same chunk size may be used for a plurality of requests, or for all requests. The sub-division of the concatenated data set 504 into contiguous chunks (rather than, for example, randomly selected sub-portions) may increase the fraction of the data set that can be read in via more efficient sequential reads than the fraction that has to be read via random reads. In some embodiments, different chunks of a given chunk mapping may have different sizes—e.g., chunk sizes need not necessarily be identical for all the chunks of a given data set. It is noted that the initial sub-division of the data set into chunks represents a logical operation that may be performed prior to physical I/O operations on the data set.

In the depicted embodiment, an initial set of candidate chunk boundaries may be determined, e.g., based on the chunk sizes being used. As shown, candidate chunk boundaries need not be aligned with file boundaries in at least some embodiments. The candidate chunk boundaries may have to be modified somewhat to align chunk boundaries with observation record boundaries in at least some embodiments when the chunks are eventually read. In at least some embodiments, the client may not necessarily be aware that at least some filtering operations (such as splitting) will be performed on chunks of the data set rather than at the granularity of individual data records. In the depicted embodiment, data transfers of the contents of the chunks (e.g., the observation records respectively included within C1-C10) may be performed to load the data set into the memories of one or more MLS servers.

In a chunk-level shuffle operation 515 performed prior to the requested split, the chunks may be re-ordered in the depicted embodiment. After the shuffle, the chunk order may be C5-C2-C7-C9-C10-C6-C8-C3-C1-C4. In a subsequent chunk-level split operation 520, 70% of the chunks (e.g., C5-C2-C7-C9-C10-C6-C8) may be placed in training set 522, while 30% of the chunks (C3-C1-C4) may be placed in a test set 524 in the depicted example. As the shuffle was performed at the chunk level, the internal ordering of the observation records within a given chunk remains unchanged in the depicted example. Thus, the observation records of chunk C1 may remain in the same relative order (OR1-1, OR1-2, ... OR1-$n$) after the shuffle and split as they were before the shuffle and split filtering operations were performed. It is noted that for at least some types of filtering operations, in addition to avoiding copies to persistent storage, the chunk contents may not even have to be moved from one memory location to another in the depicted embodiment. For example, instead of physically re-ordering the chunks from C1-C2-C3-C4-05-C6-C7-C8-C9-C10 to C5-C2-C7-C9-C10-C6-C8-C3-C1-C4 during the shuffle, pointers to the chunks may be modified, such that the pointer that indicates the first chunk points to C5 instead of C1 after the shuffle, and so on.

Generally speaking, chunk-level operations may have the advantage that only a single pass of physical read operations may be required to implement numerous different filtering operations (e.g., shuffling followed by splitting, splitting followed by shuffling, etc.), which may result in a substantial input processing speedup compared to scenarios in which the data set is copied to persistent storage (or re-read) for each successive filtering operation. Of course, although multiple chunk-level and/or observation-record-level operations may be performed in memory without accessing persistent storage, the results of any such operation may be stored to persistent storage if necessary, e.g., so that the results may be re-used later for another job. Thus, although avoiding frequent and potentially time-consuming I/O operations to disk-based or other persistent storage devices is made easier by the chunk-level technique described above, I/O to persistent storage may still be performed at any stage as and when necessary based on an application's requirements.

Figure 6:
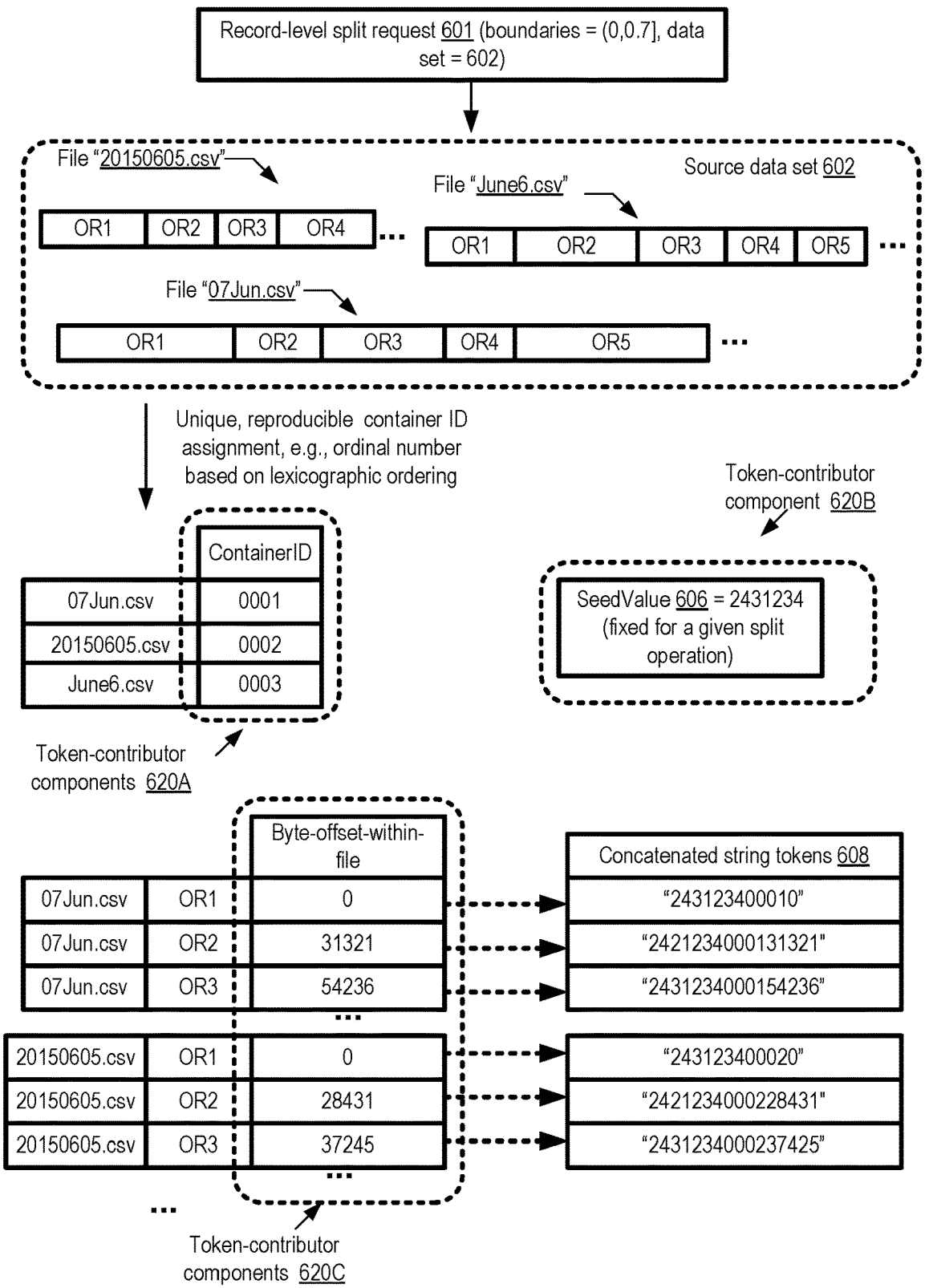
FIG. 6 and FIG. 7 collectively illustrate an example of a record-level split algorithm which may be employed to obtain test data sets and training data sets, according to at least some embodiments.
Figure 7:
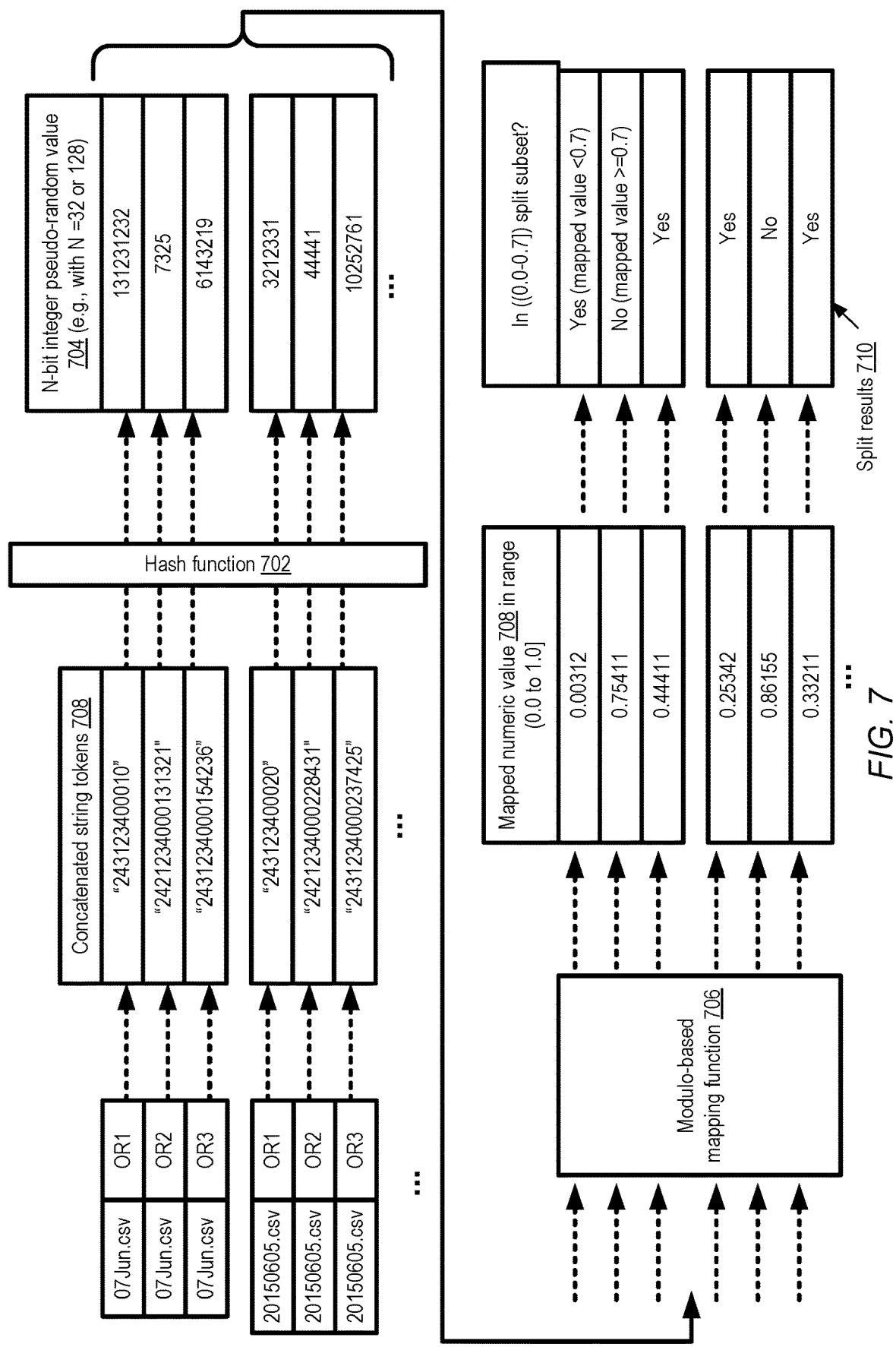

Despite their performance advantages with respect to reducing physical I/O, chunk-level filtering operations of the kind described above may not always be the best choice, especially if the observation records located near one another in a given chunk happen to be correlated with one another (e.g., in their target variable values and/or their input variable values). In such scenarios, a chunk size which is large enough to provide some of the performance advantages discussed above may result in, for example, split result sets which are not truly representative of the overall variations among the observation records. Accordingly, in at least some embodiments, an algorithm for consistent randomized splitting of data sets at the record level (without using chunk level operations of the kind described earlier) may be implemented. FIG. 6 and FIG. 7 collectively illustrate an example of a record-level split algorithm which may be employed to obtain test data sets and training data sets, according to at least some embodiments.

In summary, in the operations illustrated in FIG. 6, a unique token corresponding to each observation record of the data set is created, and in the operations shown in FIG. 7, a hashing-based pseud-random technique is applied on the unique tokens to select the particular split subsets to which various individual observation records are to be assigned. In FIG. 6, a split request 601 is received at a machine learning service, indicating a source data set 602 and boundary parameters "(0, 0.7]" for the group of observation records of the source data set which are to be included in a randomly-selected subset of the data set to be produced to fulfill the split request. The example boundary parameters "(0, 0.7]" indicate that 70% of the observation records of data set 602 are be included in the result of the split (e.g., for a proposed training set, with the remaining 30% being used as the proposed test data set). More specifically, the format "(0, 0.7]" indicates that, if a mapping of the observation records to real number values in the range between 0.0 (including 0.0) and 1.0 (excluding 1.0) is generated, those observation records which are mapped to values greater than or equal to 0.0 and less than 0.7 should be included in the result. The collection of observation records identified to meet the splitting criteria indicated in request 601 may be termed a "split subset" of the input data set 602. As described below in further detail, instead of two-valued boundary parameters (with values 0 and 0.7) of the kind shown in FIG. 6, more elaborate boundary parameters (e.g., "(0, 0.5, 0.75)", to indicate that two split subsets with 50%, and 25% of the observation records respectively are to be generated) may be indicated in split specifications or split requests in at least some embodiments. The syntax used to indicate the split boundaries may differ from one embodiment to another—for example, instead of "(0, 0.7]", "0-70%" or simply "70%" may be used in some embodiments.

In the embodiment depicted in FIG. 6, the source data set 602 comprises observation records stored in several different storage objects including files named "20150605.csv", "June6.csv" and "07Jun.csv". (The file names may indicate the dates on which respective sets of observation records were collected, for example, at different sources with different date formatting conventions being used for the file names.) Each file may include observation records of various lengths; that is, not all the observation records OR1, OR2, . . . , within a given file may comprise the same number of bytes, and the length of a given observation record in one file many not necessarily match the length of any of the records stored in any of the other files. The number of attributes or variable values in a given observation records may differ from the number of attributes included in at least some other observation records in the depicted embodiment. In different embodiments, the files of data set 602 may be stored within a single-host file system (such as the ExtFS file system), a distributed file systems (such as HDFS), or in a provider network's object storage service which exposes a web-services interface such that each file is assigned a respective URL (uniform record locator). In one embodiment, at least some of the observation records of a source data set may be stored in objects other than files (e.g., in one or more tables of a relational or non-relational database management service implemented at a provider network may be used).

A respective container identifier may be assigned to each file in the example scenario depicted in FIG. 6, e.g., based on the lexicographical ordering of the file names (e.g., fully-qualified file names including a file system identifier and a directory path, or URLs associated with the files). In a lexicographic ordering of the three files shown, file 07Jun.csv appears first and is therefore assigned the container identifier "0001" corresponding to the ordinal number 1, file 20150605.csv appears second and is therefore assigned the container identifier "0002", while file June6.csv appears third and is therefore assigned the container identifier "0003". In various embodiments, any technique that results in a consistent assignment of container identifiers to the storage objects such as files of the data set (that is, a scheme that results in the same container identifiers being assigned to the same storage objects each time container identifiers are generated) may be used. Techniques which do not employ lexicographical ordinal numbers may be used in some embodiments, e.g., container identifiers based on the creation times of the files may be employed in one embodiment.

In the algorithm whose use is depicted in FIG. 6, three types of token-contributor components 620 (including the container identifiers 620A) may be combined to generate unique concatenated string tokens 608 for respective observation records of data set 602. A seed value 606 ("2431234" in the depicted example) represents a second type of token-contributor component 620B, and the respective byte offsets of the observation records within their files represent the third type of token-contributor 620C. The order in which the token-contributors are concatenated, and the data types or formats used for the components or the concatenation result may differ from one implementation to another. In the depicted example, the concatenated string token 608 for a given observation record is formed by appending a string version of the container identifier to the seed, and then appending a string version of the byte offset to the result of the first concatenation. Thus, for example, the concatenated string token "2431234000154236" is generated for observation record OR3 of 07Jun.csv by concatenating the seed "2431234" with the container identifier "0001" and the byte offset "54236". Similarly, for OR2 of 20150605.csv, the seed is concatenated with the container identifier "0002" and the byte offset "28431" to produce the token "243123400028431".

The concatenated string tokens 608 generated for the different observation records are also shown in FIG. 7. After the token for a given observation record is generated, a selected hash function 702 may be applied to the token, generating an N-bit integer 704 (where the number of bits N may depend on the particular hash function employed) in the depicted embodiment. Any of a variety of hash functions, or a sequence of multiple hash functions, may be used in different embodiments to produce a pseudo-random value 704 corresponding to the observation record, such as MurmurHash2 or MurmurHash3 functions, Fowler-Noll-Vo (FNV) hash functions, Jenkins hash functions, or CityHash functions. In some embodiments only non-cryptographic hash functions may be used, while in other embodiments at least some cryptographic-strength hash functions (e.g., MD5 or other message digest based functions, or functions based on the Secure Hash Algorithm such as SHA-1, SHA-2, or SHA-3) may be supported for the split algorithm. In one embodiment pseudo-random functions that may not necessarily involve hashing may be used. The pseudo-random value corresponding to the token generated for a given observation record may then be mapped onto a numeric value 708, e.g., using any suitable modulo-based mapping function 706. In the depicted embodiment, the target range of values is the set of real numbers greater than or equal to 0.0 and smaller than 1.0. Thus, for example, the token generated for OR1 of 07Jun.csv hashes to the integer 131231232, which in turn is mapped to the real number 0.00312. The target range for the mapped numeric values may be selected, for example, based on the manner in which the boundaries of the split subsets are expressed in the split requests—e.g., if a 0-to-100 percentage-based boundary specification is used in a particular implementation, the target range may be set to real numbers between 0.0 and 100.0, or to integers in the range between 0 and 100.

The mapped numeric values for the respective observation records may be used to identify the particular split subset (if any) to which the observation records are assigned. Thus, in the example depicted in FIG. 7, observation records OR1 and OR3 of 07Jun.csv and observation records OR1 and OR3 of 20150605.csv are all included in the split subset corresponding to the boundary descriptor (0.0, 0.7] since each of those records' mapped numeric values 708 lie within the specified boundaries. As also shown in split results table 710, because their mapped numeric values 708 fall outside the boundary values, observation records labeled OR2 in both files are excluded from the requested split subset. It is noted that in at least one embodiment, all observation records may be assigned to respective split subsets, even if the boundaries explicitly indicated in the split request specify subsets that do not collectively make up the entire data set. For example, even though the split request 601 only requested observation records assigned to the split subset (0.0-0.7], the machine learning service may nevertheless generate a second split subset (0.7-1.0] corresponding to those observation records which are not explicitly included in the requested split subset. An indication of the assignment decision made for a given observation record may be transmitted to or stored at a destination defined for the corresponding split subset: for example, the contents of an observation record assigned to the requested (0.0-0.7] split subset may be sent to a destination machine learning service platform at which a model is to be trained or evaluated, or the address (e.g., the starting offset and size) of the observation record may be stored in a result file specified as a destination. In various embodiments, the record-level split algorithm illustrated in FIG. 6 and FIG. 7 may be described as being consistent or repeatable in that, if two split requests with identical split subset boundaries are received for a given data set, identical split subsets would be produced (assuming the same seed value is used for both requests). The use of a record-level split algorithm of FIG. 6 and FIG. 7 may, at least in some embodiments and for some data sets, generally result in a higher probability (relative to the other split algorithms discussed above) that the distribution of a target variable within a test data set is sufficiently similar to the corresponding distribution in a training data set for the test data set to be acceptable.

In various embodiments, all the computations required to assign a given observation record to a split subset (or to determine that it is not to be included in a requested split subset) may be performed as soon as that record is examined during a single pass through the data set. Thus, if a single machine learning server is being used for the split of each file shown in FIG. 6, the concatenated token, hash result and mapped numeric value for OR1 of 07Jun.csv may all be generated, and the split subset assignment decision for OR1 may be made, before the concatenated token for OR2 of 07Jun.csv is generated. The split algorithm may be designed in such a way that the computations needed for an assignment decision of a given observation record can be performed based on the properties of that observation record alone (e.g., the file to which it belongs, and the offset of the record within the file), without requiring access to stored results regarding any other observation record, and without requiring multiple accesses of the given record. A single sequential examination of a file (or other storage object in which observation records are stored) may therefore suffice to distribute all the data in the file into split subsets in various embodiments, without requiring random accesses. Since random I/O operations on disk-based storage devices may involve time-consuming disk head seek operations, the ability to split the data set without requiring random accesses may help keep I/O costs low. In some embodiments, other split algorithms may be employed in addition to or instead of the sequential, chunk-level, and record-level split algorithms discussed above.

Methods for Target Variable Distribution-Based Validation of Test Data Sets

Figure 8:
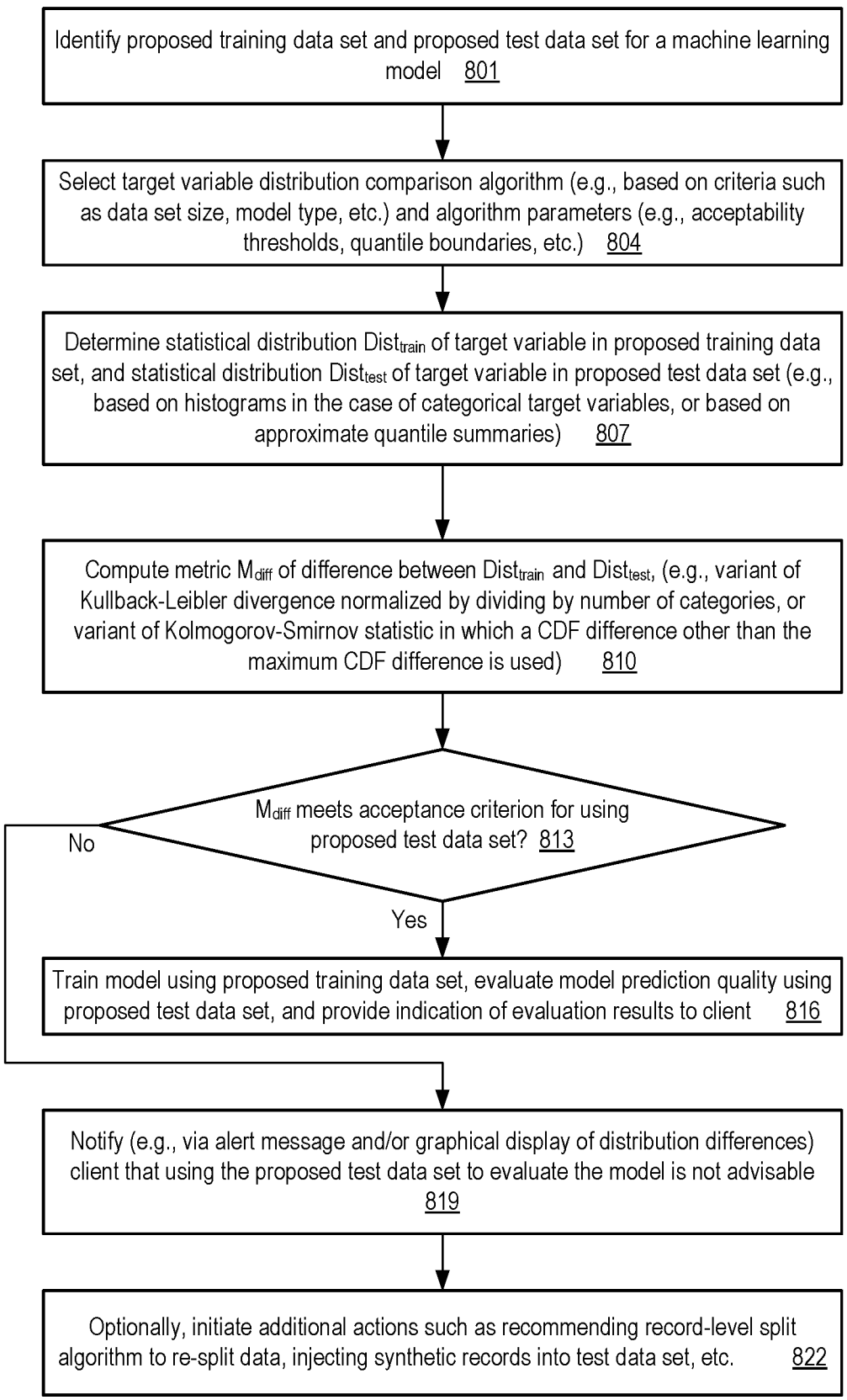
FIG. 8 is a flow diagram illustrating aspects of operations which may be performed to validate test data sets based at least in part on an analysis of the distribution of a target variable, according to at least some embodiments.

FIG. 8 is a flow diagram illustrating aspects of operations which may be performed to validate test data sets based at least in part on an analysis of the distribution of a target variable, according to at least some embodiments. As shown in element 801, a proposed test data set and a proposed training data set may be identified with respect to a particular machine learning model. Each of the two data sets may comprise a plurality of observation records, with individual observation records containing respective values of a target variable and one or more input variables, with the intention being that, after the model is trained using the training data set, the model may be used to predict the target variable values on the basis of the input variable values. The proposed test data set may be intended to evaluate the quality of the predictions made by the trained model. A statistics manager, which may be implemented as a component of a machine learning service in some embodiments, may determine based on various triggering criteria that a target variable distribution comparison based algorithm is to be used to help decide whether the proposed test data set is acceptable in the depicted embodiment. It is noted that there may be certain types of models and/or certain input data sets for which the acceptability of the test data set may not have to be validated.

A particular algorithm for comparing target variable distributions may be selected (element 804) based on various factors similar to those discussed in the context of FIG. 2, such as the type of model being developed, the size of the data set, etc. Parameters for the algorithm, such as the acceptability threshold for the metrics of distribution differences, the number of quantiles into which the target variables is to be distributed (if quantile-based distribution comparison is to be used), etc., may also be selected. In some embodiments some of the parameters (or the algorithm to be used) may be indicated by clients on whose behalf the analysis is being conducted. In other embodiments the statistics manager may select the algorithm and/or the parameters based on knowledge base entries, heuristics and the like.

The statistical distribution $Dist_{train}$ of the target variable within the training data set, and the statistical distribution $Dist_{test}$ of the target variable within the test data set may be obtained (element 807), e.g., based on an examination of some subset or all of the observation records of the respective data sets. Depending on the type of the target variable, in some cases histograms may be constructed to obtain the statistical distributions, while in other cases quantile summaries (e.g., approximate quantile summaries generated using the Greenwald-Khanna algorithm) may be used. In the Greenwald-Khanna algorithms and other similar approaches, a summary data structure representing a given data set (e.g., the proposed training or test data sets) may be maintained, corresponding to a subset of the observation records of the set. For each observation included in the summary, implicit bounds on the minimum and maximum rank of that observation among the observations examined thus far may be stored with the summary. Such a summary may be used to respond to quantile-related queries or perform approximate quantile-based computations.

A metric $M_{diff}$ indicative of the difference between $Dist_{train}$ and $Dist_{test}$ may be obtained (element 810). In some cases, e.g., when the target variable is a categorical variable, a variant of a Kullback-Leibler divergence metric may be used as $M_{diff}$. K-L divergence, which may also be referred to as discrimination information, information divergence, or information gain, is a measure of the difference between two probability distributions P and Q (which in the context of test data set validation are the target variable distributions of the proposed test data set and the proposed training data set). In at least some embodiments, respective histograms whose buckets correspond to individual category values of a categorical target variable in the proposed test data set and the proposed training data set may be generated. Then, a symmetrized K-L divergence between the test and training histograms may be obtained using entropy measures associated with the histograms, which involves computing a mean of (a) the K-L divergence of the proposed test data set with respect to the proposed training data set and (b) the K-L divergence of the proposed training data set with respect to the proposed test data set. In some implementations, the symmetrized K-L divergence metric initially obtained from the histograms may be adjusted or normalized by dividing the metric by the number of categories to obtain $M_{diff}$.

In other cases, when the target variable is a non-categorical numeric variable, a variant of a Kolmogorov-Smirnoff (K-S) statistic may be used, e.g., in conjunction with the use of approximate quantile summaries as discussed above. In one embodiment, instead of using the maximum difference among the cumulative distribution function (CDF) values for the different quantiles as the K-S statistic, the second-highest or third-highest such difference may be used for $M_{diff}$. For example, consider a scenario where the difference measures for the CDFs (between the test and training data) for four different quantiles Q-a, Q-b, Q-c and Q-d are D1, D2, D3 and D4 respectively, where D1>D3>D2>D4. Instead of using D1 as the K-S statistic used for $M_{diff}$, D3 or D2 may be used as $M_{diff}$ in some embodiments, e.g., to avoid problems associated with edge cases. The particular ranking of the CDF difference which is used as $M_{diff}$ (i.e., whether the $2^{nd}$ highest difference such as D3 in the above example, or the $3^{rd}$ highest such as D2) may be selected based on knowledge base entries in some embodiments. Other difference metrics may be used in different embodiments—e.g., metrics derived from p-values may be used for data sets whose sizes are below a threshold. In at least one embodiment, the computations of $Dist_{train}$, $Dist_{test}$ and $M_{diff}$ may be performed at least partly in parallel—that is, the operations to determine the distributions may not have to be completed in a separate step before the operations to determine the difference metric are begun.

If $M_{diff}$ meets an acceptance criterion (as detected in operations corresponding to element 813), the proposed test data set may be designated as acceptable for evaluating the quality of the model (where the evaluation would be performed after the model has been trained using the proposed training data set). A client on whose behalf the proposed test data set was being analyzed may be informed regarding the acceptability of the proposed test data set in some embodiments via a programmatic interface. The model may be trained using the proposed training data set and then evaluated using the proposed test data set (element 816). The results of the evaluation of the model's prediction quality (which may be expressed in any of a variety of metrics including precision, recall, mean-squared error, and the like) may be provided to the client in some embodiments.

If $M_{diff}$ does not meet the acceptance criterion (as also detected in operations corresponding to element 813), the client may be informed regarding the inadvisability of evaluating the model with the proposed test data set (element 819). Any of a number of different communication techniques may be used to inform the client, such as providing an alert via a programmatic interface, displaying a graphical representation of the differences in the distributions of the target variable between the proposed test and training data sets, etc. In some embodiments, additional actions responsive to unacceptability may optionally be initiated, such as injecting synthetic records into the test data set (which may require pre-approval from the client), recommending a different split algorithm for re-splitting the input data into new proposed test and training subsets, and the like (element 822).

Example Programmatic Interfaces

Figure 9:
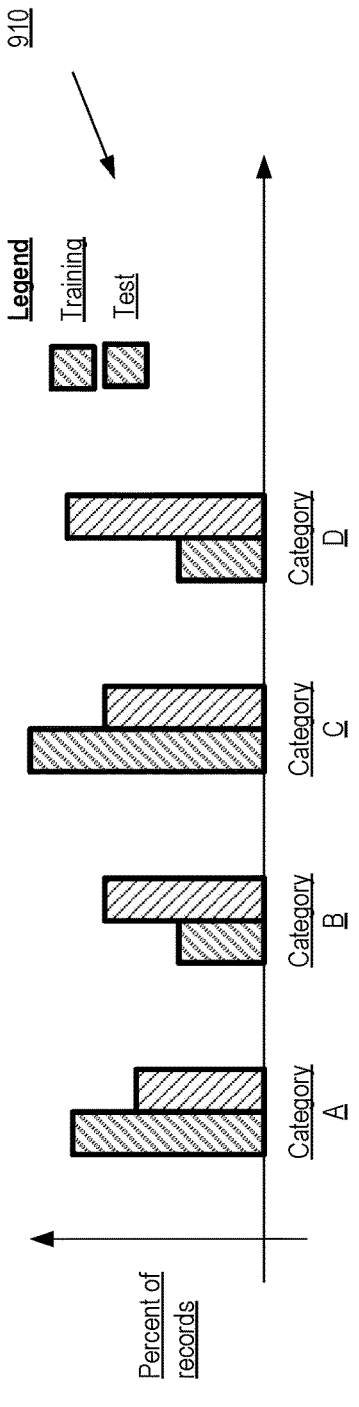
FIG. 9 and FIG. 10 illustrate respective programmatic interfaces which may be used to provide information to a client regarding the distribution of a target variable in test and training data sets, according to at least some embodiments.
Figure 10:
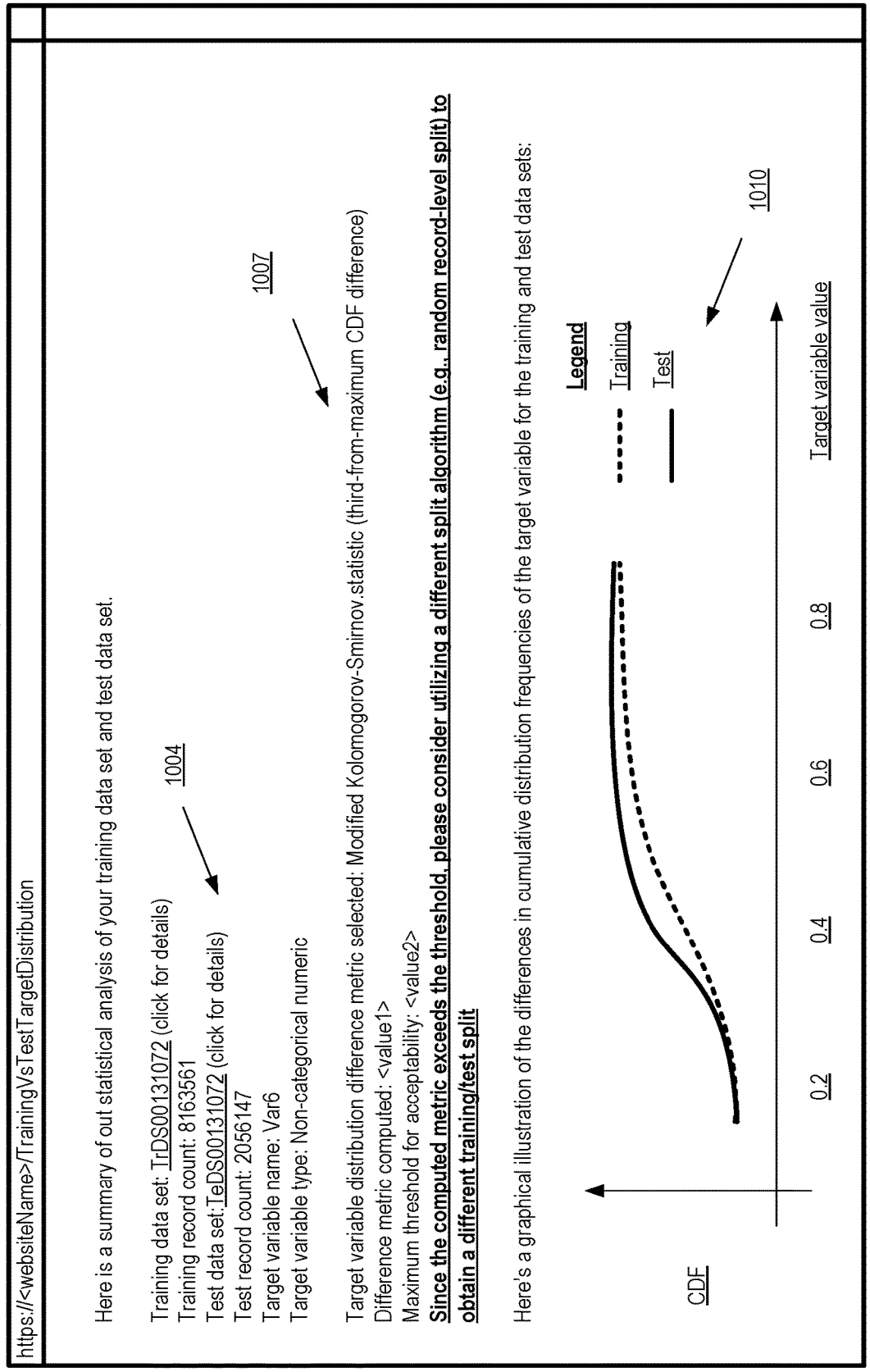

FIG. 9 and FIG. 10 illustrate respective programmatic interfaces which may be used to provide information to a client regarding the distribution of a target variable in test and training data sets, according to at least some embodiments. In FIG. 9, web page 901 comprises an informational region 904, analysis result and recommendation section 907, and graphical representation section 910. In region 904, respective identifiers of the proposed test data set (TeDS00131033) and proposed training data set (TrDS00131033) are provided, together with the numbers of observation records in the data sets (2056147 and 8163561 for the test and training data sets respectively) and the name and type of the target variable. In the analysis result and recommendation section 907, the name (a variant of K-L divergence), computed value and acceptance threshold for the difference metric used is provided. In addition, section 907 indicates that the acceptance criterion was not met, and recommends a re-splitting of the input data using a record-level splitting algorithm.

Histograms corresponding to the categories A, B, C and D of the target variables are shown for the proposed test and training data sets in region 910. A graphical representation similar to that shown in region 910, which shows substantial differences in the percentage of target variable values for the different category values in the depicted example, may help provide insights to clients regarding the distributions of the target variable, and in at least some cases may be helpful in convincing clients to initiate one or more recommended actions.

Web page 1001 of FIG. 10 includes regions analogous to those of web page 901 of FIG. 9, with the primary difference being that the target variable for whose distribution information is being provided is a non-categorical numeric variable instead of a categorical variable as was the case in FIG. 9. Region 1004 indicates the names of the test and training data sets, the number of observation records in each data set, and the name and type of the target variable. Region 1007 indicates that a variant of the Kolmogorov-Smirnov statistic is used as the measure of distribution differences, in which the third-highest cumulative frequency distribution (CDF) difference is utilized as the difference metric. A recommendation to re-split the input data set to obtain new proposed test and training data sets is provided in region 1007 as well. In region 1010, the CDFs of the test and training data sets are shown, which indicate the dissimilarity between the target variables in the two data sets.

It is noted that in different embodiments, interfaces which are not necessarily web-based (such as standalone graphical user interfaces and/or command-line tools) may be employed to indicate distribution-related information analogous to that shown in FIG. 9 and FIG. 10 to clients. In some embodiments, graphical displays of distribution differences may not necessarily be provided.

Iterative Split Request Processing

Figure 11:
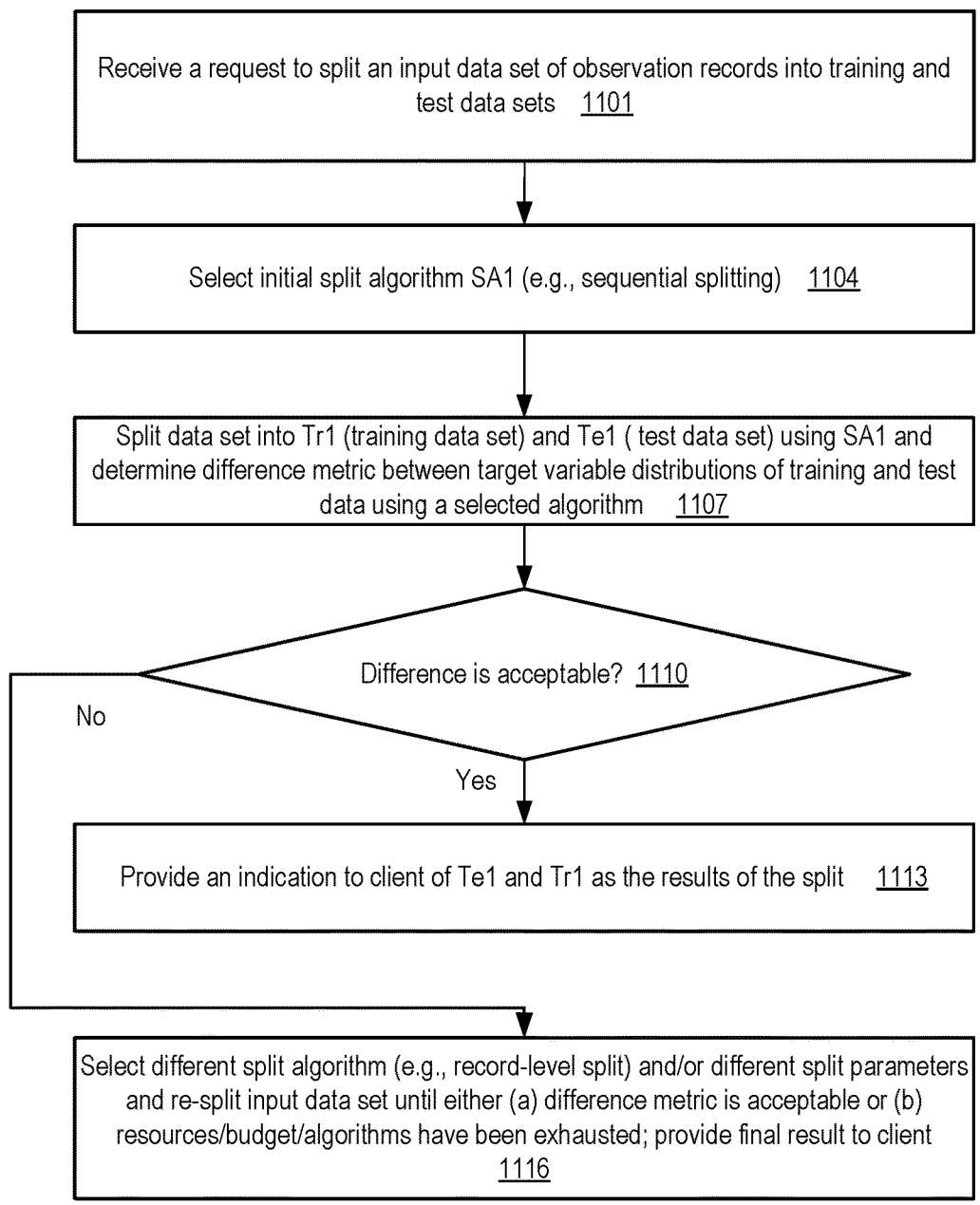
FIG. 11 is a flow diagram illustrating aspects of operations which may be performed in response to a split request received from a client, according to at least some embodiments.

In some embodiments, target variable distribution-based analysis may be performed in response to a split request submitted by a client. Thus, for example, in addition to simply dividing a data set into test and training subsets in response to a split request, a machine learning service may automatically validate the quality of the split before providing the split results to the client, and in some cases re-split the input data one or more times to ensure that the similarity of the distributions of the target variable in the split result data sets is acceptable. FIG. 11 is a flow diagram illustrating aspects of operations which may be performed in response to a split request received from a client, according to at least some embodiments. As shown in element 1101, a split request may be received from a client, e.g., at a machine learning service. The split request may indicate the data sources (e.g., a set of files, database tables, or some combination of files and tables) from which observation records of an input data set for a model are to be obtained, as well as the desired split parameters (e.g., the percentage of records to be included in the training and test data sets resulting from the split). Other parameters may also be provided in the split request in some embodiments, such as a target resource consumption limit, a budget limit, or a time limit by which the results of the split are to be provided.

A machine learning service component may select an initial split algorithm SA1 (e.g., from among the algorithms discussed in the context of FIG. 5-FIG. 8, such as sequential splitting) (element 1104). In some embodiments, sequential splitting may be used as the default algorithm, e.g., due to its simplicity and low resource consumption. In one embodiment, a client may include an indication of a split algorithm in the split request. The input data may be split into a first pair of training and test data subsets (Tr1 and Te1 respectively) using SA1 (element 1107). An algorithm to compare the distributions of the target variable in the first split data sets Tr1 and Te1 may be selected, e.g., using some of the factors discussed in the context of FIG. 2, and a difference metric (such as a variant of K-L divergence, or a variant of the K-S statistic) may be computed using the algorithm. The difference metric may be compared to a threshold to determine whether the difference between Tr1 and Te1 is acceptable.

If the difference is acceptable (as detected in operations corresponding to element 1110), indications of Tr1 and Te1 (e.g., the addresses or identifiers of the records included in Tr1 and Te1) may be provided to the client (element 1113), and the response to the split request may be considered complete.

If the difference is unacceptable (as also detected in operations corresponding to element 1110), the machine learning service may attempt to take actions to improve the quality of the split (element 1116). For example, one or more re-split operations may be performed, using a different split algorithm (e.g., chunk-based splitting and/or record-level splitting) or using different split parameters than were used to obtain Tr1 and Te1. The results of each re-split may be analyzed using the target variable distribution comparison approach. Such iterations of re-splitting and target variable distribution analysis may be repeated in the depicted embodiment until the test/training split meets acceptance criteria, until the available resources are exhausted or time is exhausted, or until reasonable split algorithm alternatives or reasonable split parameter alternatives are exhausted. The final results of the split (e.g., either a test/training split which meets the acceptance criteria, or the split which came closest to meeting the criteria) may be provided to the client.

Post-Evaluation Analysis Example

Figure 12:
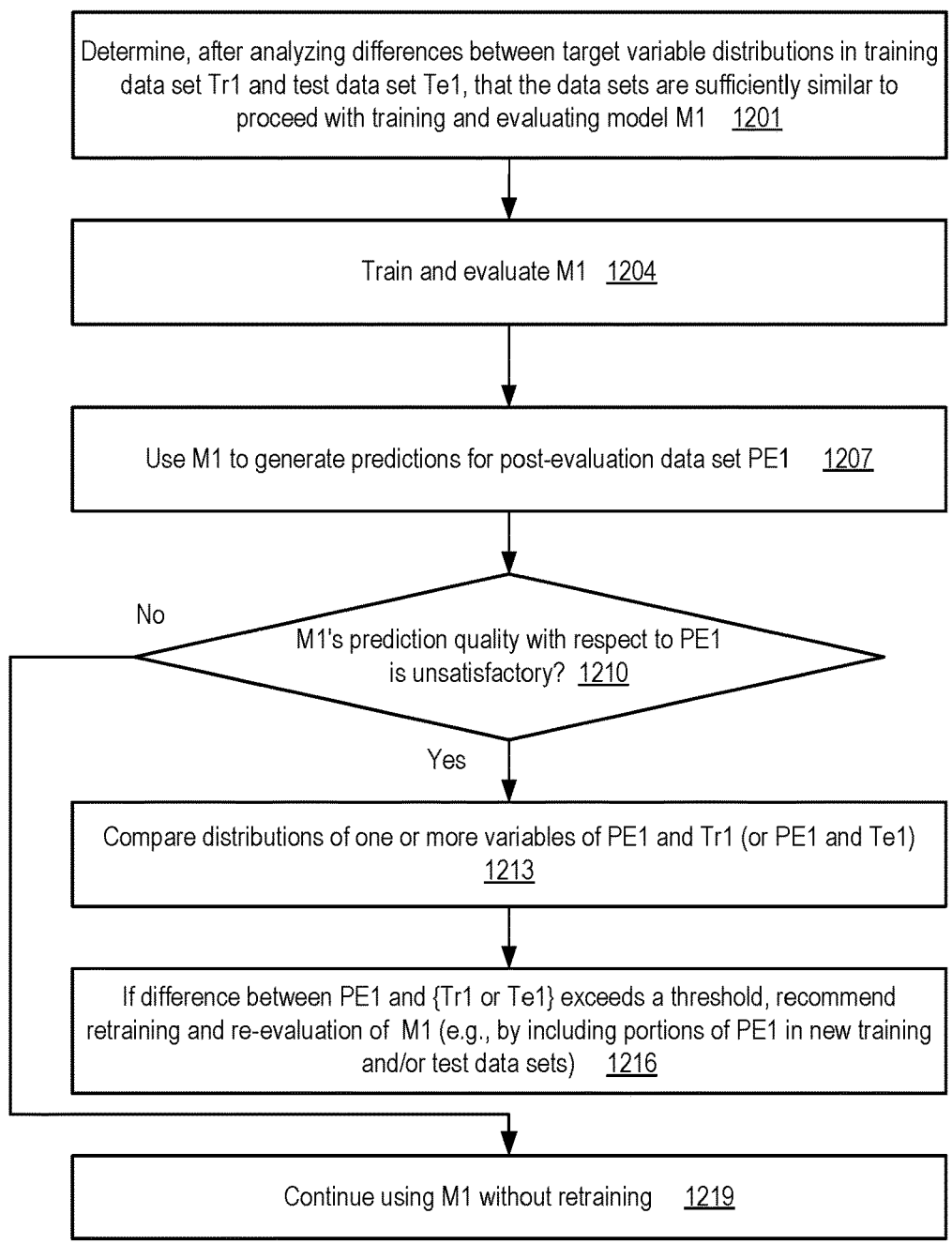
FIG. 12 is a flow diagram illustrating aspects of operations which may be performed in response to determining that the quality of the predictions of a machine learning model is unsatisfactory, according to at least some embodiments.

In some embodiments, some of the statistical characteristics of the data that were used to train and evaluate a model may not always match the characteristics of the observations for which predictions have to be made after the model is deployed in a production or post-evaluation environment. For example, the observation for which predictions have to be made using the trained model may be collected from a more diverse set of data sources than the training and test data sets were, or something in the environment from which the observation records are collected may have changed relative to the time that the training and test data sets were obtained. FIG. 12 is a flow diagram illustrating aspects of operations which may be performed in response to determining that the quality of the predictions of a machine learning model is unsatisfactory, according to at least some embodiments.

As shown in element 1201, a determination may be made that a given training set Tr1 and a given test data set Te1 are sufficiently similar with respect to target variable distributions for a model M1 to be trained and evaluated using Tr1 and Te1. The model M1 may then be trained using Tr1, and evaluated using Te1 (element 1204). After M1 has been trained, and its prediction quality with respect to Te1 has been evaluated and found to be satisfactory, M1 may be deployed to make predictions on production or post-evaluation data set PE1 (element 1207).

The quality of M1's prediction with respect to PE1 (which may be determined in terms of various metrics such as accuracy, recall, precision, mean square error, etc., depending on the type of model M1) may be evaluated. Of course, labels (target variable values) may not necessarily be known for post-evaluation data at the time that the predictions are made. In some cases, however, the target variable values may become known later—e.g., if the target variable value is an indicator of whether a given stock price is going to rise within D days by X %, the quality (or lack thereof) of a prediction may become apparent within (D+1) days of the prediction. If the quality is unsatisfactory (as detected in operations corresponding to element 1210), a target variable distribution comparison analysis may be initiated between PE1 and Tr1 (or PE1 and Te1). In effect, this analysis may be designed to determine whether it is the case that the post-evaluation data set Pe1 is different enough (at least with respect to the target variable distribution) from the original training data or test data to justify a re-training of the model using a modified training set. Thus, the target variable distribution of PE1 may be compared to that of one (or both) of Tr1 and Te1 (element 1213) in the depicted embodiment. In some embodiments, comparisons of the distributions of one or more non-target variables may be performed, e.g., in addition to or instead of comparisons of the distributions of the target variable. If the difference between the variable distributions exceeds a threshold, a recommendation to re-train and re-evaluate of M1 with modified training and test data sets may be generated in at least some embodiments (element 1216). The training and test data sets to be used to re-train or re-evaluate M1 may be modified by adding observation records selected (e.g., using random selection) from PE1, and/or by adding synthetic observation records whose target variable distribution resembles that of PE1, in some embodiments. If the quality of M1's predictions is satisfactory (as also detected in operations corresponding to element 1210), no re-training may be required, and M1 may continue to be used for additional predictions (element 1219).

It is noted that in various embodiments, operations other than those illustrated in the flow diagrams of FIGS. 8, 11 and 12 may be used to implement at least some of the techniques associated with target variable distribution analysis described above. Some of the operations shown may not be implemented in some embodiments, may be implemented in a different order, or in parallel rather than sequentially.

Use Cases

The techniques described above, of validating or approving test data sets for machine learning models on the basis of target variable distribution comparisons with corresponding training data sets may be beneficial for a wide variety of applications. Many machine learning input data sets may be large, and as a result the resources required to train and evaluate models using the data sets may be substantial. If the evaluation of the model using a selected test data set indicates that the model's predictions are inadequate with respect to quality, a decision to re-train the model may be made. However, the evaluation results may, in some cases indicate that the model predictions are unsatisfactory because of a difference in the distribution of the target variable between the test data used for the evaluation and the training data, and not necessarily because of flaws in the model training algorithm or flawed selection of model parameters. If, prior to beginning the training of the model, an analysis is performed to ensure that the proposed training data and the proposed test data are reasonably similar with respect to the distribution of the target variable, it may become possible to avoid potentially expensive unnecessary iterations of training and evaluation. As a result, the total time and resources taken to train, evaluate and deploy models for production use may be reduced, compared to scenarios in which target variable distribution analysis is not performed.

Illustrative Computer System

Figure 13:
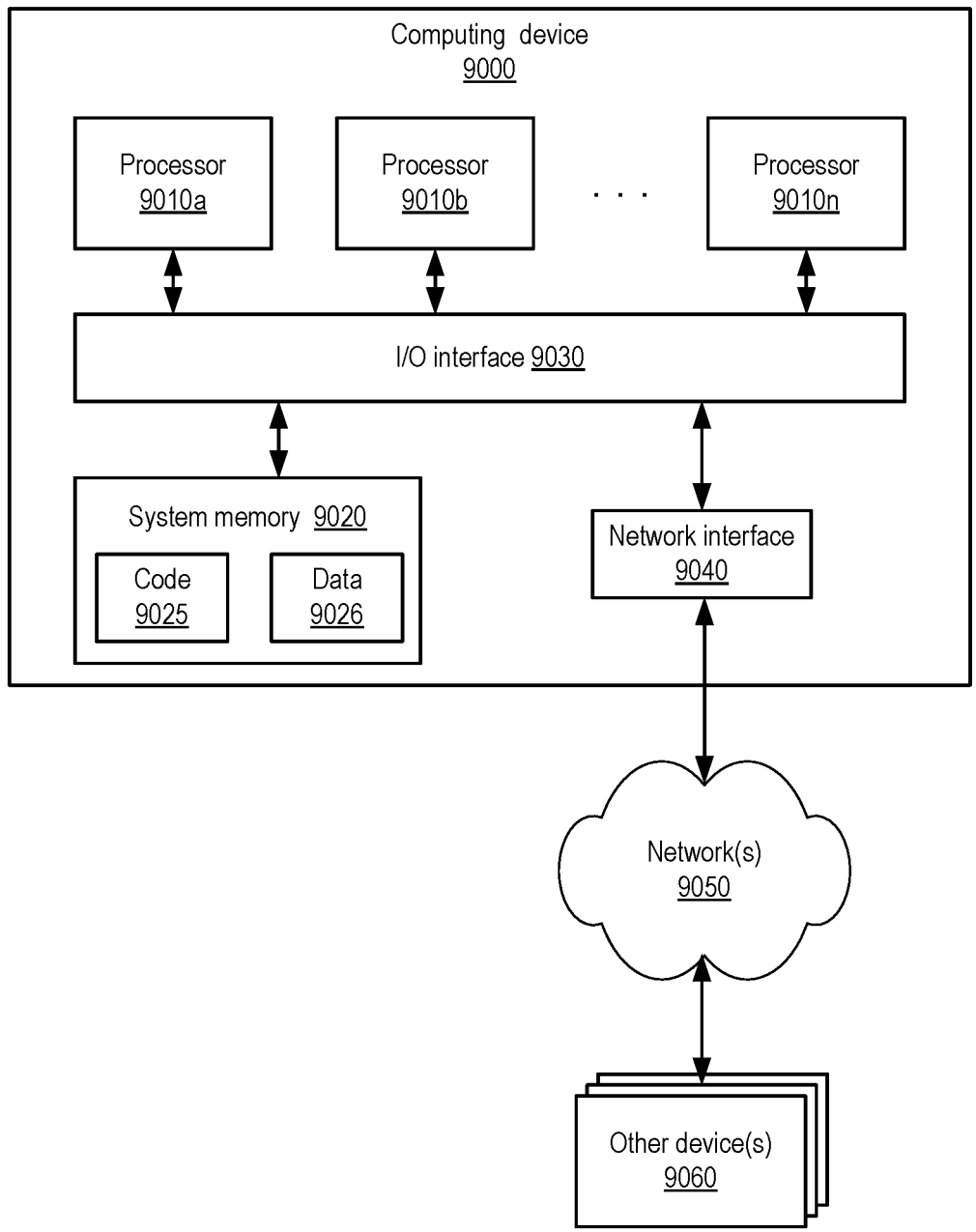
FIG. 13 is a block diagram illustrating an example computing device that may be used in at least some embodiments.

In at least some embodiments, a server that implements one or more of the components of a machine learning service (including control-plane components such as API request handlers, input record handlers, statistics managers, plan generators, job schedulers, artifact repositories, and the like, as well as data plane components such as MLS servers) may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   obtaining an indication of a first data set;
   determining available computational resources for one or more computing devices to perform an algorithm to be used to determine acceptability of the first data set as an input data set for a machine learning model;
   identifying, based at least in part on a model type of the machine learning model, the determined available computational resources and the first data set, the algorithm to be used to determine acceptability of the first data set as the input data set for the machine learning model; and
   causing to be presented, via one or more programmatic interfaces, one or more results obtained using the algorithm, wherein the one or more results indicate a difference in one or more statistical properties between the first data set and a second data set.

2. The computer-implemented method as recited in claim 1, wherein the first data set is a test data set, and wherein the second data is a training data set.

3. The computer-implemented method as recited in claim 1, wherein the model type comprises one or more of: (a) a linear regression model type or (b) a logistic regression model type.

4. The computer-implemented method as recited in claim 1, wherein the algorithm comprises one or more of: (a) a chi-squared test, (b) Welch's t-test, (c) a Kullback-Leibler divergence based algorithm, or (d) an algorithm based on a Kolmogorov-Smirnoff statistic.

5. The computer-implemented method as recited in claim 1, wherein said identifying the algorithm is based at least in part on a resource constraint indicated via a programmatic interface.

6. The computer-implemented method as recited in claim 1, further comprising:
   causing to be presented, via the one or more programmatic interfaces, an indication of a threshold for determining acceptability of the first data set.

7. The computer-implemented method as recited in claim 1, further comprising:
  causing to be presented, via the one or more programmatic interfaces, a recommendation of an algorithm to obtain a different data set to be used as input for the machine learning model.

8. A system, comprising:
  one or more computing devices;
  wherein the one or more computing devices include instructions that upon execution on or across the one or more computing devices cause the one or more computing devices to:
  obtain an indication of a first data set;
  determine available computational resources for a further one or more computing devices to perform an algorithm to be used to determine acceptability of the first data set as an input data set for a machine learning model;
  identify, based at least in part on a model type of the machine learning model, the determined available computational resources and the first data set, the algorithm to be used to determine acceptability of the first data set as the input data set for the machine learning model; and
  cause to be presented, via one or more programmatic interfaces, one or more results obtained using the algorithm, wherein the one or more results indicate a difference in one or more statistical properties between the first data set and a second data set.

9. The system as recited in claim 8, wherein the first data set is a data set to be used to evaluate the machine learning model.

10. The system as recited in claim 8, wherein the model type comprises one or more of: (a) a linear regression model type or (b) a logistic regression model type.

11. The system as recited in claim 8, wherein the algorithm comprises one or more of: (a) a chi-squared test, (b) Welch's t-test, (c) a Kullback-Leibler divergence based algorithm, or (d) an algorithm based on a Kolmogorov-Smirnoff statistic.

12. The system as recited in claim 8, wherein the one or more computing devices include further instructions that upon execution on or across the one or more computing devices further cause the one or more computing devices to:
  initiate a modification of the first data set in response to a determination that the first data set does not satisfy an acceptability criterion for use as an input data set for the machine learning model.

13. The system as recited in claim 8, wherein the one or more computing devices include further instructions that upon execution on or across the one or more computing devices further cause the one or more computing devices to:
  obtain, via the one or more programmatic interfaces, an indication of a threshold for determining acceptability of the first data set.

14. The system as recited in claim 8, wherein the one or more computing devices include further instructions that upon execution on or across the one or more computing devices further cause the one or more computing devices to:
  cause to be presented, via the one or more programmatic interfaces, an indication of (a) a type of difference metric used to determine acceptability of the first data set and (b) a value of the difference metric obtained using the algorithm.

15. One or more non-transitory computer-accessible storage media storing program instructions that when executed on or across one or more processors cause the one or more processors to:
  obtain an indication of a first data set;
  determine available computational resources for one or more computing devices to perform an algorithm to be used to determine acceptability of the first data set as an input data set for a machine learning model;
  identify, based at least in part on a model type of a machine learning model, the determined available computational resources and the first data set, the algorithm to be used to determine acceptability of the first data set as the input data set for a machine learning model; and
  cause to be presented, via one or more programmatic interfaces, one or more results obtained using the algorithm, wherein the one or more results indicate a difference in one or more statistical properties between the first data set and a second data set.

16. The one or more non-transitory computer-accessible storage media as recited in claim 15, wherein the first data set is a data set to be used to train the machine learning model.

17. The one or more non-transitory computer-accessible storage media as recited in claim 15, wherein the model type comprises one or more of: (a) a linear regression model type or (b) a logistic regression model type.

18. The one or more non-transitory computer-accessible storage media as recited in claim 15, wherein the algorithm comprises one or more of: (a) a chi-squared test, (b) Welch's t-test, (c) a Kullback-Leibler divergence based algorithm, or (d) an algorithm based on a Kolmogorov-Smirnoff statistic.

19. The one or more non-transitory computer-accessible storage media as recited in claim 15, storing further instructions that when executed on or across the one or more processors further cause the one or more processors to:
  identify the algorithm based at least in part on an assumed statistical distribution of values of a variable included in the first data set.

20. The one or more non-transitory computer-accessible storage media as recited in claim 15, wherein the one or more results comprise one or more of: (a) a histogram or (b) a cumulative distribution frequency.

\* \* \* \* \*